(12) United States Patent
     Brady

(10) Patent No.: US 10,875,062 B2
(45) Date of Patent: Dec. 29, 2020

(54) SINTERED WAVE POROUS MEDIA TREATMENT, APPARATUS AND PROCESS FOR REMOVAL OF ORGANIC COMPOUNDS AND NONDESTRUCTIVE REMOVAL AND CONDENSATION OF PER AND POLYFLUOROALKYL SUBSTANCES AND RELATED FLUORINATED COMPOUNDS

(71) Applicant: Ezraterra, LLC, Bend, OR (US)

(72) Inventor: Patrick Richard Brady, Sisters, OR (US)

(73) Assignee: EZRATERRA, LLC, Bend, OR (US)

( * ) Notice: Subject to any disclaimer, the term of this patent is extended or adjusted under 35 U.S.C. 154(b) by 39 days.

(21) Appl. No.: 16/151,942

(22) Filed: Oct. 4, 2018

(65) Prior Publication Data

US 2020/0108429 A1    Apr. 9, 2020

(51) Int. Cl.
     *B09C 1/06*    (2006.01)

(52) U.S. Cl.
     CPC ..................... *B09C 1/06* (2013.01)

(58) Field of Classification Search
     CPC  B09C 1/00; B09C 1/005; B09C 1/007; B09C 1/02; B09C 1/025; B09C 1/06; B09C 1/062; B09C 1/065; B09C 1/067; B09C 1/08
     USPC ... 405/128.15, 128.45, 128.5, 128.55, 128.6, 405/128.7, 128.85; 588/17
     See application file for complete search history.

(56) References Cited

U.S. PATENT DOCUMENTS

| | | |
|---|---|---|
| 4,738,206 A | 4/1988 | Noland |
| 4,864,942 A | 9/1989 | Fochtman et al. |
| 4,977,839 A | 12/1990 | Fochtman et al. |
| 5,067,852 A | 11/1991 | Plunkett |
| 5,098,481 A | 3/1992 | Monlux |
| 5,213,445 A | 5/1993 | Ikenberry et al. |
| 5,228,804 A | 7/1993 | Balch |
| 5,230,167 A | 7/1993 | Lahoda et al. |
| 5,302,118 A | 4/1994 | Renegar et al. |
| 5,361,514 A | 11/1994 | Lahoda et al. |
| 5,424,045 A * | 6/1995 | Orman ............... B01D 53/8668 422/171 |
| 5,613,452 A * | 3/1997 | Marchesi ............. B09B 3/0091 110/215 |
| 5,622,864 A * | 4/1997 | Buchanan ................ B09C 1/00 134/111 |
| 5,836,718 A | 11/1998 | Price |
| RE36,222 E | 6/1999 | O'Ham |
| 6,000,430 A | 12/1999 | Bova et al. |
| 6,110,430 A | 8/2000 | Swisher, Jr. et al. |
| 6,146,596 A | 11/2000 | Hill et al. |

(Continued)

FOREIGN PATENT DOCUMENTS

EP           0546649 A2    6/1993

*Primary Examiner* — William V Gilbert
(74) *Attorney, Agent, or Firm* — Raven Patents, LLC

(57) ABSTRACT

Methods of treating porous media, including methods of nondestructive removal of PFAS contaminants from soil, and apparatus for carrying out thermal decontamination of porous substrates. The thermal decontamination apparatus sinters and shapes the media to be remediated, and then provides sequential sectionalized treatment using treatment gases that are drawn through the sintered media, extracted, and then treated to remove contaminants extracted from the treated media.

22 Claims, 14 Drawing Sheets

(56) References Cited

U.S. PATENT DOCUMENTS

| | | |
|---|---|---|
| 6,296,815 B1 | 10/2001 | Walker et al. |
| 6,829,844 B2 | 12/2004 | Brady et al. |
| 7,618,215 B2 | 11/2009 | Haemers et al. |
| 8,348,551 B2 | 1/2013 | Baker et al. |
| 9,636,723 B2 | 5/2017 | Brady |
| 2001/0023852 A1* | 9/2001 | Kato .................... B01D 53/007 204/158.2 |
| 2004/0240942 A1* | 12/2004 | Richter .................. B09C 1/005 405/128.35 |
| 2010/0263751 A1* | 10/2010 | Ringuette ................ B09C 1/06 137/565.17 |
| 2016/0303625 A1* | 10/2016 | Desmarais ............... B09C 1/06 |
| 2020/0179997 A1 | 6/2020 | Ross et al. |

* cited by examiner

SINTERED WAVE POROUS MEDIA TREATMENT, APPARATUS AND PROCESS FOR REMOVAL OF ORGANIC COMPOUNDS AND NONDESTRUCTIVE REMOVAL AND CONDENSATION OF PER AND POLYFLUOROALKYL SUBSTANCES AND RELATED FLUORINATED COMPOUNDS

BACKGROUND OF INVENTION

The use of petroleum hydrocarbons, crude oil, pesticides, solvents and other organic chemical compounds is ubiquitous in society. Consequently, these compounds have been stored and handled in great quantities. One risk associated with storage and handling of these compounds is the potential of spillage during handling or the potential leakage from tanks and lines. Historic industrial and commercial practices have resulted in significant releases to the environment over the past 150 years. Properties contaminated with these compounds located in upland areas often contribute to sediment contamination in nearby waterways. Due to the negative environmental impact associated with spills and leakages rules have been established at the local, state and federal levels. These rules primarily focus on the prevention of releases to the environment. These rules also have provisions that require responsible parties to remediate historical and present day chemical releases into the environment. The rules initially were focused on protection of groundwater. The rules have evolved to include protection of the air including indoor air. Contaminated soil serves as a source media for groundwater plumes and soil vapor plumes. When groundwater or soil vapor move through contaminated media (soil), the groundwater and soil vapor becomes contaminated transporting contaminants away from the source area. Soil vapor plumes have been found to impact indoor air quality. Soil remediation, removal of the contaminants from the source media, solves groundwater and air pollution issues.

New emerging contaminants such as per- and polyfluoroalkyl substances (PFAS), particularly perfluorooctane sulfonate (PFOS) and perfluorooctanoic acid (PFOA) will periodically come to the forefront of public concern due to unexpected toxicity and mobility. PFAS has been used since the 1940s in a wide variety of everyday products including Teflon, Scotchguard and Aqueous Film Forming Foam (AFFF) for firefighting among other products. AFFF is commonly found associated with petroleum fires especially around airports, plane crash sites and oil refineries. Recent research has found the PFAS has impacted the majority of people in the United States through drinking water ingestion. The PFAS is a global issue with no commercially available method to safely remove these compounds from soil.

In the field of soil remediation there are two basic approaches: applying a treatment technique to soil in place (in situ), or applying a treatment technique to excavated soil (ex situ). There are advantages and disadvantages to both, which entirely depends on the site-specific circumstances of the chemical release.

There are numerous ex situ treatment techniques available for petroleum hydrocarbons, solvents, PCBs and pesticides; however, ex situ treatment techniques are not available for PFAS due to the exceptionally strong bond between Fluorine and Carbon. Extreme high temperatures are required to destroy PFAS and extremely hazardous Hydrofluoric Acid (HF) gas is produced during high temperature destruction. Attempts to destroy PFAS can produce shorter chain Fluorinated compounds with higher toxicity. The present invention may be categorized as a thermal desorption technology although cold air treatment gases and aqueous solutions or a combination could be used for organic compound contaminant removal (including PFAS), metal stabilization or oxidation processes to reduce anaerobic noxious odors. The sintering (densification), shaping process (shaped holes or slots) of the porous media (typically soil or sediment), the automated static arrangement (active treatment components move around the static soil bed), moving the treatment gases through open channels in the soil to enhance capillary flow rather than pulling the treatment gases through the soil itself (porous flow), the ability to take Cristobalite in the soil through its sudden inversion volumetric change to remove residual contaminants at extremely low concentrations, the sequential treatment (treat small sections at a time) approach and the ability to remove both hydrocarbons and PFAS (nondestructive removal) puts this invention in its own unique field of art in soil remediation.

Prior art for ex situ thermal desorption technologies reveal that there are two basic categories of thermal desorption techniques: 1) techniques that involve mechanical agitation of the soil during the heating process and 2) techniques that are applied to static configuration of soil.

Often the techniques that involve mechanical agitation also operate in a continuous process where soil is continuously introduced to the process and is mechanically moved through the process apparatus until treatment is complete, and then is continuously discharged to a container for disposal or reuse.

Alternatively, techniques that are applied to static configuration of soil are generally treated in batches where a batch or given amount of soil is introduced to the apparatus; the treatment process is started, and when complete, is stopped and the treated soil removed. The next batch of soil is then introduced to the treatment apparatus. Static configuration techniques may also be broken down into two subcategories: (a) pile arrangement and (b) container arrangement.

Another characteristic of thermal desorption technology is the source of heat and the gas used to affect the decontamination. The exact mechanisms that occurs in thermal desorption is not well understood and a variety of techniques have been proposed in prior art. Some processes use combustion gases from the burning of fossil fuels for both of the source of heat and the treatment gas. Sometimes the fuel is supplemented by recirculating the contaminated off gas from the treated soil to the burn chamber as additional fuel. Other processes have used fresh air, or inert air as the treatment gas, and heat the treatment gas indirectly in a heat exchanger prior to introducing the gas to the soil, or heat the soil and not heat the treatment gas.

Nearly all the prior art processes use combustion of fossil fuel as a heat source. This has undesirable consequences of forming incomplete products of combustion, oxides of nitrogen and sulfur, and other greenhouse gases as a by-product. Combustion also has the potential to add unburned hydrocarbon to the process exhaust gas if strict control of the combustion process is not maintained.

A variety of temperatures have been used for the treatment and in control of the off-gas temperature, which is indicative of soil temperature. The temperature and time at temperature may be varied depending on the specific characteristics of the soil and contaminants.

The prior art contains a variety of processes making use of the allowable variables. U.S. Pat. No. 4,738,206 (Noland), U.S. Pat. No. 4,864,942 (Fochtman), U.S. Pat. No.

4,977,839 (Fochtman) and U.S. Pat. No. 7,618,215 (Haemers) describes continuous process apparatus that make use of combustion gas for heat. The processes vary greatly in the temperature used with U.S. Pat. No. 4,738,206 teaching a range of 120 to 450 degrees F. and U.S. Pat. Nos. 4,864,942 and 4,977,839 claiming a range of 300 to 400 degrees C., which is 572 to 752 degrees F. They also vary in the treatment gas with U.S. Pat. No. 4,738,206 using combustion gas and U.S. Pat. Nos. 4,864,942 and 4,977,839 teaching the use of an inert gas such as Nitrogen and the addition of water. All of these Patents rely on moving treatment gases through the soil under porous flow conditions.

A characteristic of these continuous processes is the use of heavy material handling equipment that uses large amounts of energy in moving the material through the treatment process. This energy use is in addition to that expended in treating and in excavating the material and returning it to its final state. Further, continuous processes treat soil in a very short period of time (in minutes), which result is using large amounts of energy. There is no precision in the application of energy due to the short treatment times. The lack of precision in energy application creates a cumulative waste in energy through a large project.

Static processes that use a pile arrangement are described in U.S. Pat. No. 5,067,852 (Plunkett), U.S. Pat. No. 5,213,445 (Ikenberry), U.S. Pat. No. 5,228,804 (Balch), U.S. Pat. No. 5,836,718 (Price), and U.S. Pat. No. 6,000,882 (Bova). The apparatus of each of these consists of soil that is placed on a treatment surface then layered with differing configurations of piping until the desired configuration is attained. The pile is then covered with a vapor proof covering prior to treatment. These processes also vary greatly in temperature used. U.S. Pat. No. 5,067,852 uses unheated air as the treatment gas, but teaches some heat is advantageous. At the other end of the temperature range U.S. Pat. No. 5,228,804 teaches the use of air heated in a heat exchanger to 1,200 to 1,400 degrees F. as a treatment gas. More moderate treatment gas temperatures, to 300 degrees F., are used in U.S. Pat. No. 5,213,445 using the treatment gas of combustion products from recirculating the off gas, while U.S. Pat. No. 6,000,882 injects combustion gas of at least 800 degrees F. and perhaps as high as 2,500 degrees F. to raise the soil temperature to the 212 to 350 degrees F. range, then exhausts the off gas through the same piping. Another approach is taken by U.S. Pat. Nos. 5,836,718 and 7,618,215 in that the soil is heated by conduction through the walls of the piping in the soil pile to a temperature of 90 to 250 degrees C. (194 to 452 degrees F.) and the fresh air treatment gas is not heated.

The pile arrangement processes do not require energy intensive material handling during treatment; however, they may be characterized as requiring labor intensive setup and disassembly in the activity of layering the piping system within the soil pile and removing it after treatment and also covering and uncovering the completed pile.

Static processes that use container arrangements are not as prevalent in the prior art. One example is US Patent Reissue No. 36,222 (O'Ham) that has the contaminated soil loaded into a tray shaped treatment container, and then directs combustion heat and gases on the surface of the soil while the off gas is removed from the bottom of the container. Temperatures are not given, but the inlet gas temperatures may be assumed to be in the upper end of the temperature range. U.S. Pat. No. 6,296,815 (Walker) takes another approach. The soil is loaded into tall-insulated containers and then electric resistance heaters are inserted into the soil. The containers are moved into an insulated treatment vessel and the soil heated directly. The details of the process are not given. Another container arrangement is described in U.S. Pat. No. 6,829,844 B2 (Brady et al) describes the use of a thermally conductive vessel that fits within an insulated treatment chamber. Desiccated electrically heated air is introduced to the treatment chamber where the air is drawn through the thermally conductive vessel via vacuum lines located near the bottom; treatment gases are drawn through the soil under porous flow conditions. The treatment gas is maintained below 1,300 F. U.S. Pat. No. 8,348,551 teaches a vehicle can drive in a treatment chamber where sacks, cartons and drums can be loaded and unloaded directly into a treatment chamber, which is subsequently heated. U.S. Pat. No. 9,636,723 (Brady) teaches soil can be treated in sections inside a thermally conductive vessel placed inside a treatment chamber. This patent also relies on porous flow through the soil bed where screen pipes are spaced to minimize the travel distance between hot air entry and exit.

The advantages of a static process using a container is the container can provide for ease of loading and unloading material reducing labor when compared with pile arrangements, and it does not require high energy costs for material handling when compared to continuous processing arrangements. A disadvantage of these prior art container arrangements is they require handling the soil to move it from the container in which it was placed after excavation, which presumably would be a dump truck hopper, load it into the treatment container for treatment, and then handle it again following treatment to put in back into the dump truck hopper disposition.

Static arrangements are perhaps the most cost-effective treatment option for large scale situations; however, static arrangements have issues related to treatment gas and contaminant transport through porous media. This is especially true for higher molecular weight compounds present in saturated fine grain soils. Static arrangement effectiveness is dependent on soil type, moisture concentration and type of contaminant. Saturated fine grain soil contaminated with a high molecular weight compounds such as crude oil will not be effectively treated by static arrangements. Air flow is minimal through saturated fine grain soils rendering static arrangements not effective. In drier more permeable soils, high molecular weight compounds will evaporate then re-condense when cooler portions of the soil bed are encountered as the treatment gases move through the soil bed (porous flow conditions). These phenomena result in longer treatment times that increase energy consumption and increased cost. Bench and pilot testing are required to assess static arrangement effectiveness for each project.

Another issue related to static arrangements is the nature of treatment gas movement through the soil bed. All prior art technologies move treatment gases through the porous media (porous flow conditions) from an entry point to an exit point. The issue with the concept is that soils near the entry point are quickly treated while the exit point soils are treated last. The entry soils are continually heated beyond what is necessary for effective treatment, which is a waste of energy. Soil is a poor conductor of heat, which cause large thermal gradients over significant distances. This practice creates re-condensation issues within the soil bed. Further, the pile arrangements typically treat the entire pile at once, which require larger blower, heater and vapor treatment apparatus. These larger equipment requirements create a limit of how large the pile arrangement can be, which in turn impacts the scalability of the device. There is no precision in the application of energy due to the nature of treatment gas flow through porous media. Soils at the entry point are repeatedly treated when treatment is complete and soils at the exit received minimal treatment. The lack of precision in energy application creates a cumulative waste in energy through a large project.

An ancillary issue related to pile arrangements with soils containing higher natural occurring total organic compounds (TOC) is the thermal degradation of the natural TOC. Silts, clays and sediments typically have higher TOC concentrations and are not as thermally conductive as coarse grain soils (sands and gravels). Acetone and Methyl Ethyl Ketone (MEK) are generated as high TOC soils are heated. If left to cool in a pile, concentrations of acetone and MEK increase causing an unintended contaminant situation to develop within the treated soil. The soil needs to be properly cooled to stop the thermal degradation of the natural occurring TOC after thermal treatment. In situ thermal technologies have produced acetone and MEK contaminant situations during and after treatment because there is no means to quickly cool soils underground.

Currently the high molecular weight treatment market is not served with a technology that can be reliably operated on a large scale. Sediment and saturated fine grain soils are also not adequately addressed in the market. Landfills are the only reliable solution for large scale high molecular weight compound contaminant situations. Landfills simply store contaminated soils or sediments in perpetuity (forever).

In addition, there are no commercially available technology that can remove PFAS from soil. Landfills are the only accepted means of offsite disposal for PFAS; however, landfills are experiencing PFAS releases to groundwater due their solubility and surfactant nature of these compounds. The current research in PFAS soil treatment is to try to destroy the compounds at the site using extreme low ph (less than 3.0) solutions or extremely high temperature for incineration (1,800 F). Technology to removal PFAS from water is established and currently in use. The water treatment technologies are all absorption/filtration related treatments that rely on off site destruction or disposal of the concentrated wastes. This invention removes PFAS from the soil and concentrates the compounds so they can be disposed or destroyed off site.

The review of the prior art summarized above indicates a need for ex-situ static arrangement process that is labor efficient by requiring only a single soil handling step during excavation and then maintains the soil in the same vessel until it is returned to the site of disposition, is time and energy efficient in the treatment process, is precise in energy application, and is environmentally friendly by avoiding combustion in the treatment process and by using air temperatures below those conductive to forming oxides of Nitrogen and Sulfur and PM. There seems to be a need for large scale treatment technologies that can reliably treat high molecular weight compound in a variety of porous media including saturated fine grain soils that avoids the pitfalls of prior art static arrangements. In addition, there is a need to remove PFAS from soil as there are no technologies available. Simultaneous treatment of PFAS and hydrocarbons together is also needed to deal with past application of AFFF on hydrocarbon fires.

SUMMARY OF INVENTION

The present disclosure is directed to methods of treating porous media, methods of nondestructive removal of PFAS contaminants from soil, and apparatus for thermal decontamination of porous substrates.

In some examples, the present disclosure relates to a method of treating porous media that includes depositing the porous media in a sealable sintering vessel having a first side and a second side; densifying the deposited porous media using vibration to form a sintered media bed; forming a plurality of vertical channels in the sintered media bed, each vertical channel extending from an upper surface of the sintered media bed to a lower surface of the sintered media bed; sealing the sealable sintering vessel; defining a plurality of lateral sections of the sintered media bed, each lateral section extending from the upper surface of the sintered media bed to the lower surface of the sintered media bed, and from the first side of the sealable sintering vessel to the second side of the sealable sintering vessel; selecting a first lateral section of the plurality of lateral sections of the sintered media bed, and passing a heated gas through the formed vertical channels in the first lateral section; and passing the heated gas through the formed vertical channels of each of the remaining lateral sections of the plurality of lateral sections of the sintered media bed in sequence.

In some examples, the present disclosure relates to a method of nondestructive removal of PFAS contaminants from soil, including depositing soil that contains or is thought to contain PFAS contaminants in a sealable sintering vessel having a first side and a second side; densifying the deposited soil using vibration to form a sintered soil bed; forming a plurality of vertical channels in the sintered soil bed, each vertical channel extending from an upper surface of the sintered soil bed to a lower surface of the sintered soil bed; sealing the sealable sintering vessel; defining a plurality of lateral sections of the sintered soil bed, each lateral section extending from the upper surface of the sintered soil bed to the lower surface of the sintered soil bed, and from the first side of the sealable sintering vessel to the second side of the sealable sintering vessel; selecting a first lateral section of the plurality of lateral sections of the sintered soil bed, and passing heated air at a temperature of about 1,100° F. through the formed vertical channels in the first lateral section; and passing the heated air through the formed vertical channels of each of the remaining lateral sections of the plurality of lateral sections of the sintered soil bed in sequence; permitting the sintered soil bed to rest at a soil temperature greater than about 400° F. for a time sufficient to mobilize PFAS contaminants in the sintered soil bed; cooling the sintered soil bed by passing cooling air at ambient temperature through the formed vertical channels of each of the plurality of lateral sections of the sintered soil bed in sequence and collecting the cooling air at the lower surface of the media bed by drawing the cooling air into one or more lateral extraction lines in a floor of the sealable sintering vessel using a vacuum blower; and condensing PFAS contaminants from the collected cooling air.

In some examples, the present disclosure relates to apparatus for thermal decontamination of a porous substrate, the apparatus including a sealable sintering vessel configured to hold the porous substrate, the sealable sintering vessel including a first side wall and a second side wall, a first end, and a second end, and a floor that includes a plurality of extraction lines extending at right angles to the side walls of the sealable sintering vessel; a shaping head that is configured to move from the first end wall to the second end wall of the sintering vessel, where the shaping head includes a vibrating member capable of densifying the porous substrate, and a plurality of extendable rods capable of forming vertical channels in the densified porous substrate, the formed vertical channels extending from an upper surface of the densified porous substrate to the sintering vessel floor; an air injection head that is configured to move from the first end to the second end of the sintering vessel, where the shaping head is configured to inject treated gases into the vertical channels formed in the densified porous substrate within each of a series of lateral sections of the sintering vessel, where each lateral section extends from the upper surface of the densified porous substrate to the sintering vessel floor, and from the first side wall to the second side wall of the sintering vessel, and each lateral section corresponds to one or more of the plurality of extraction lines in the sintering vessel floor; a sealable flexible cover, coupled to the air injection head, where the cover extends from the first side wall to the second side wall and from the first end to the second end of the sintering vessel, and can accommodate a sequential movement of the air injection head from the first end to the second end of the sintering vessel; wherein the apparatus is configured to inject air into a densified porous substrate using the air injection head, and collect the injected air from the corresponding one or more extraction lines using a vacuum blower.

OBJECTS AND ADVANTAGES

One object of this invention is to densify and shape the soil in an automated way to facilitate effective, safe and efficient treatment on a large scale using a static container arrangement.

A second object of this invention is to provide a treatment vessel that is wheel loader, scraper or dump truck compatible, which allows easy loading and unloading of soil into and out of the treatment vessel.

A third object of this invention is to provide a treatment vessel that is large enough to serve as a sealed storage facility for contaminated soil thus avoiding multiple handling of the soil and improving site wide fugitive emissions.

A fourth object of this invention is to use capillary flow as the principle means of water and contaminant transport from the porous media to the shaped transport holes or slots within the densified soil bed using high velocity hot air to transport contaminants to an off-gas treatment system. Densified soil facilitates capillary flow through reduction of pore throat diameters, expelling soil vapor, and creating a saturated or near saturated condition, which capitalizes on the fluid/water cohesion theory.

A fifth object of this invention is to provide for hexagon shaped holes pressed into the densified soil bed from the top to the bottom of the bed to enhance capillary flow with the six 120 degree internal angles within the hexagon hole. As an alternative, slots containing 120 degree angles can be used in place of the hexagonal holes.

A sixth object of this invention is to provide an effective means to evenly and quickly distribute heat throughout the soil bed. Soil is a poor conductor of heat; sintering (densification) and shaping (pressing hexagonal holes or slots) dramatically improves heat delivery to soil. Large thermal gradients within the soil bed facilitates creation of desiccation cracking, which in turn facilitates contaminant flow to the sectionalized extraction piping.

A seventh object of this invention is to provide a sectionalized sequential treatment strategy spreading the energy demand in small sections over the entire arrangement rather than sizing equipment to treat the entire arrangement at once.

An eighth object of this invention is to provide a thermal desorption technique which uses non-combustive heat source. This eliminates the formation of oxides of nitrogen and sulfur due to combustion and the potential of incomplete combustion products to the process exhaust. The treatment gas temperature is maintained well below the formation temperature of Hydrofluoric acid when removing PFAS.

A ninth object of this invention is to provide a treatment that controls the maximum temperature of the air, thereby maintaining temperatures below those conductive to formation of oxides of nitrogen and sulfur.

A tenth object of this invention is to provide a static arrangement that is automated, which reduces intensive labor for set up and take down and prevents particulate matter (PM) from entering the atmosphere during treatment.

An eleventh object of this invention is to provide a static arrangement vessel that allows earth moving equipment (dump trucks, wheel loaders and scrapers) to enter and exit the vessel for ease of loading and unloading.

A twelfth object of this invention is the sequential wave treatment of the formed soil bed.

A thirteenth object of this invention is the inert narrow band of high temperature, high velocity air used to safely remove high concentration organic contaminants.

A fourteenth object of this invention is the use of a non-active treatment zone situated between the inert and ambient wave to allow the soil to remain at temperature before final ambient wave treatment.

A fifteenth object of this invention is the use of the ambient wave to remove residual contaminants mobilized during the non-active treatment temperature soak.

The sixteenth object of this invention is the use of the ambient wave as a diagnostic tool to determine if retreatment is required. Carbon monoxide concentrations relative to acetone and MEK concentrations and temperature rise indicate if additional inert wave treatment is necessary.

The seventeenth object of this invention is the self-diagnostic regenerative wave system working in conjunction to efficiently and completely treat the formed soil bed.

The eighteenth object of this invention is the nondestructive removal of PFAS from soil.

The nineteenth object of this invention is to use naturally occurring cristobalite as a reliable means to change the volume of the soil at 365 F to 419 F, which is above the boiling temperatures of PFAS.

The twentieth object of this invention is the use of a direct spray vapor stream cooling system to condense the majority of PFAS into water where it can be removed for offsite destruction or disposal.

The twenty-first object of this invention is that the recycled cooling water maintains treatment vapor stream above ambient temperatures that prevent water condensing in the tank while at the same time condensing PFAS into the cooling water.

The twenty-second object of this invention is that the cooling water can be analyzed for each batch so PFAS contaminant concentration can be measured in the field using dynamic surface tension analysis combined with an offsite analytical laboratory.

DESCRIPTION OF DRAWINGS

The version of the Invention discussed here includes.

Figure 1:
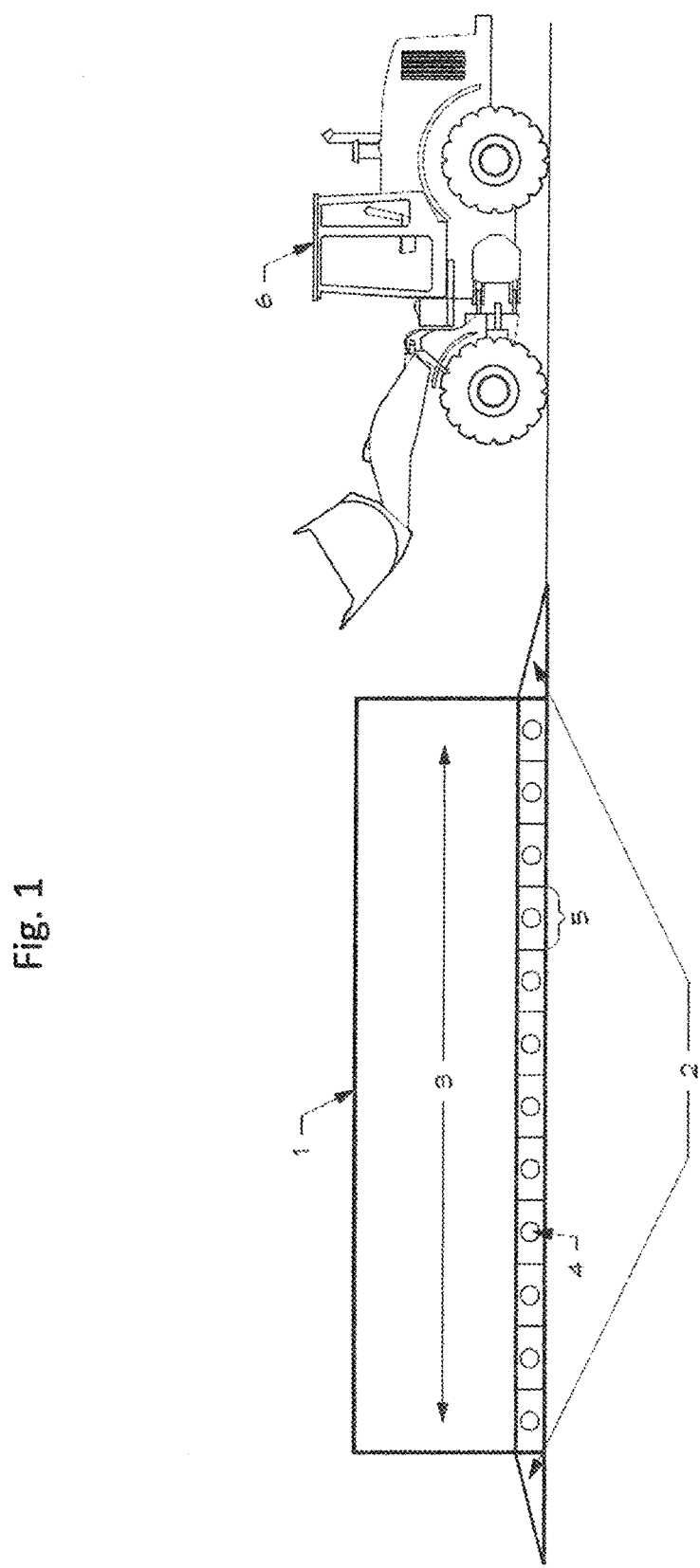
FIG. 1 General Arrangement Wheel Loader Loading Sinter Craft
FIG. 2 Sinter Craft Cross Section
FIG. 3 Sinter Craft Subfloor Map View
FIG. 4 Sinter Craft Floor Map View
FIG. 5 Sinter Craft Head Works Shaping
FIG. 6 Sinter Craft Air Injection Head Works FIG. 7 Sinter Craft Air Injection Sled Top Cover Embodiment FIG. 8 Sinter Craft Fixed Cover/Heated Space Heat Application Embodiment FIG. 9 Sinter Craft Cross Section General Treatment Airflow FIG. 10 Fluorinated Compound Treatment Arrangement General Cross Section FIG. 11 Fluorinated Compound Treatment Arrangement General Map View FIG. 12 Perspective View showing Sinter Craft loading with Wheel loader FIG. 13 Perspective View Showing Sintering and Shaping of the Soil Bed FIG. 14 Perspective View Active Inert Wave, Soak Zone and Ambient Wave (ISA) Treatment

RELATIONSHIP BETWEEN THE COMPONENTS/DESCRIPTION OF COMPONENTS (1) Sinter Craft Walls contains soil bed;

(2) Sinter Craft Access ramps provide access to interior of Craft;

(3) Sinter Craft Access Door provides access on both ends of Craft and closes during treatment;

(4) Subfloor sectionalized extraction line provides sequential vapor extraction during treatment when hot air injection active directly above;

(6) Subfloor extraction line chamber provide an isolated chamber to direct hot air extraction from hot air injection directly above;

(7) Wheel loader loads and unloads Sinter Craft;

(8) Sinter Craft Wall Vibrators densify the soil bed (sintering);

(9) Subfloor extraction line chamber wall provide isolation for extraction line; Sinter Craft rail floor provide a surface amenable to wheel loaders and scraper bucket blades;

(10) Densified (Sintered) Soil Bed makes pores smaller and removes air and makes the soil easy to shape to accommodate enhanced capillary flow;

(11) Shaping Headworks inserts holes or slots into Sintered (densified) soil bed;

(12) Hole punch rod is pressed into sintered soil bed. As an alternative, blades could be used to install slots in the soil bed;

(13) Shaping headworks vibrator used to assist in placing and removing push rods;

(14) Punched holes or slots in sintered soil bed accommodates narrow band of high velocity hot air to flow through sintered soil bed;

(15) Inert hot air injection port injects low oxygen (less than 10% Oxygen) high temperature air at high velocities into sintered and shaped soil bed;

(16) Non-Active Treatment area allows the soil to soak in elevated temperature before the final ambient wave arrives;

(17) Ambient hot air injection port uses ambient air (21% oxygen) high temperature and high velocities to complete treatment and to diagnose if treatment is complete;

(18) Inert-Soak-Ambient (ISA) Unit houses the inert, soak and ambient treatment gas application;

(19) Sinter Craft flex steel rolling cover used to seal Sinter Craft during treatment and to move the ISA unit forward;

(20) Alternate Embodiment headspace heating; hot air can be injected from the side into the headspace above the soil bed and the extraction lines can be sequentially operated;

(21) Valve to isolate treatment to narrow zone that includes one or more vapor extraction chamber (5);

(22) Vacuum blower draws treatment gases through soil bed and delivers to vapor treatment system;

(23) Vapor treatment system, which includes either commercially available carbon absorption, catalytic oxidation, thermal oxidation or other treatment system;

(24) Cooling Chase, directly sprays water into vapor stream to cool vapors;

(25) Spray rings, the apparatus that delivers a high-pressure water fan across the vapor stream pathway along the cooling chase;

(26) Fluorinated compound condensation unit captures the water spray and routes the vapor stream through baffles to remove entrained water from the vapor stream. A demister screen located in a tower mounted on top of the tank removes any residual water mists. Cooling water is recycled so the vapor stream will never be below ambient temperatures avoiding water condensation within the tank;

(27) Demister screen, removes residual mists in the vapor stream at the top of a tower mounted on the fluorinated compound condensation unit tank;

(28) jet pump, recycles water from the tank (26) and delivers the high-pressure water to the spray rings (25) in the cooling chase (24);

(29) Cooling water, water is recycled so that the gradual warming of the water prevents vapor temperatures from being cooled to below ambient temperature; prevents water condensation in tank (26);

(30) Sample port, allows cooling water (29) to be sampled and subsequently analyzed for contaminant concentration;

(31) Purge pipes, slotted pipe that are submerged at the bottom of the tank (26) and vented to the outside; the vent has a valve. When the valve is opened air is drawn into the water, which will evaporate the water creating the ability to measure low concentrations of PFAS in the field;

(32) High-pressure water lines that deliver water from the jet pump (28) to the spray rings (25) in the cooling chase (24);

DRAWING AND COMPONENT DESCRIPTION

Figure 2:
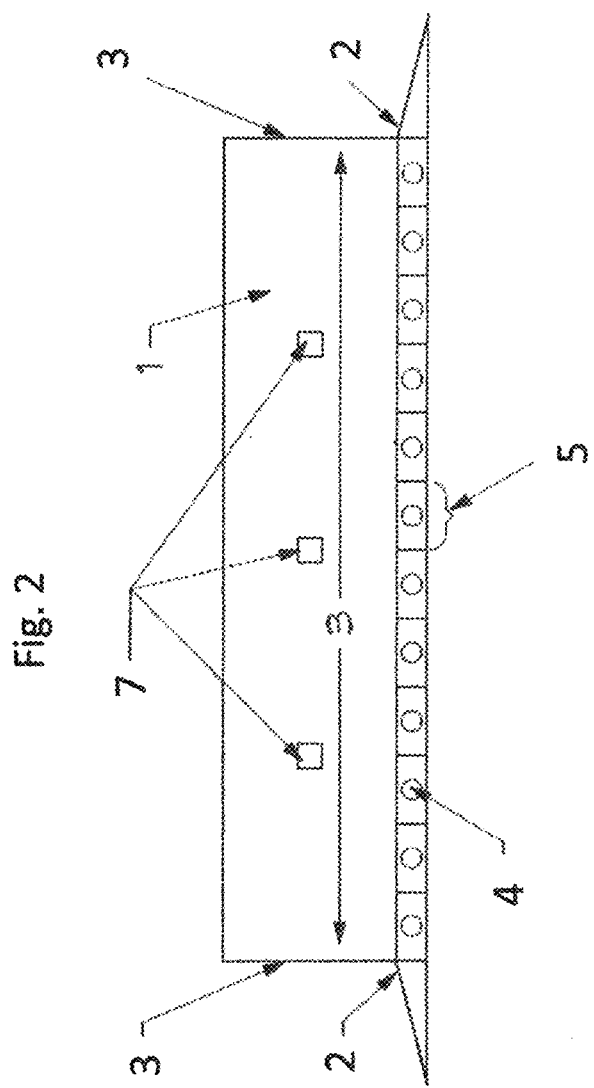
Figure 3:
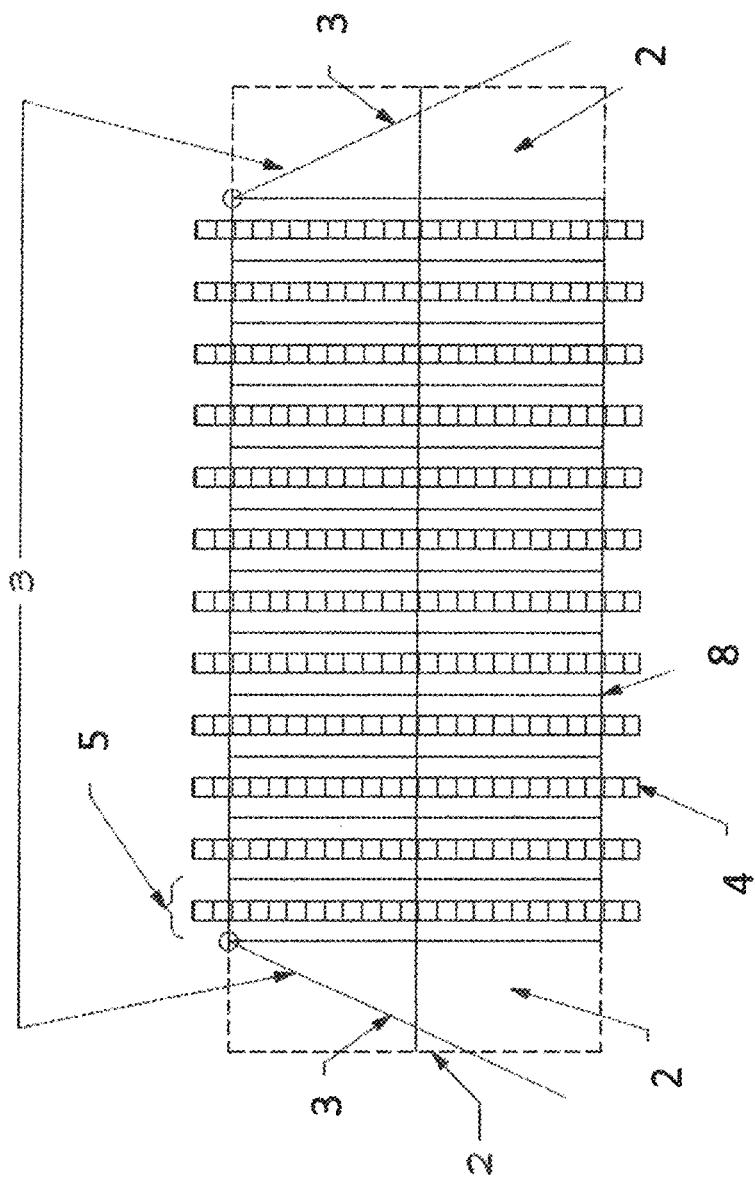
Figure 4:
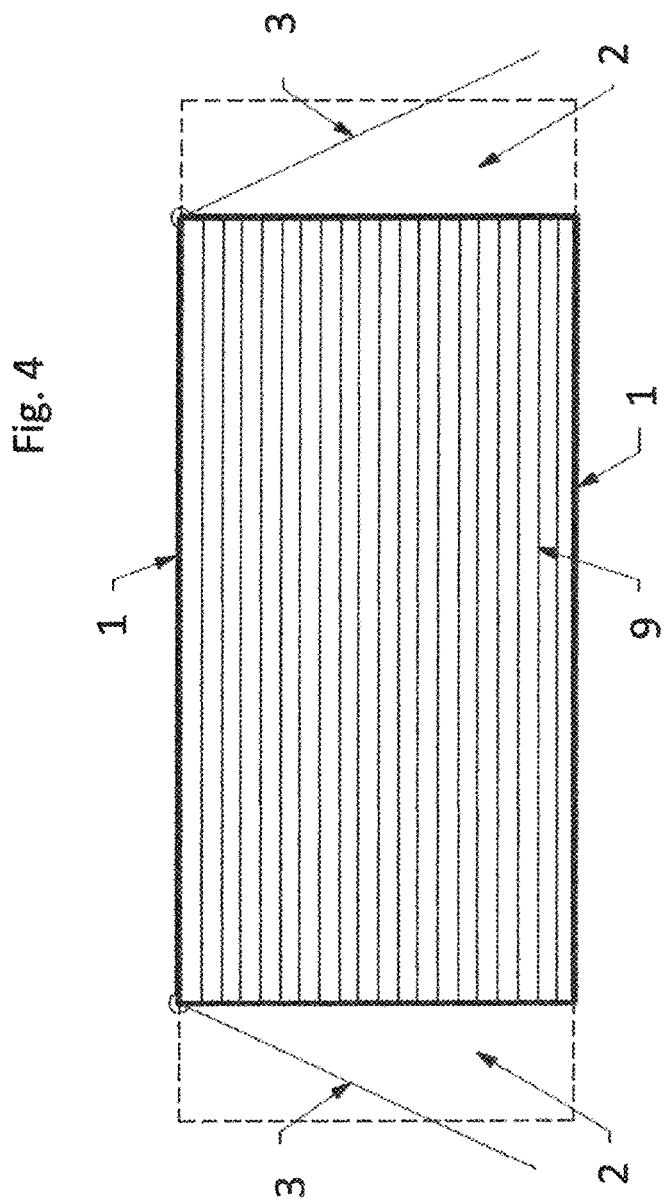
Figure 5:
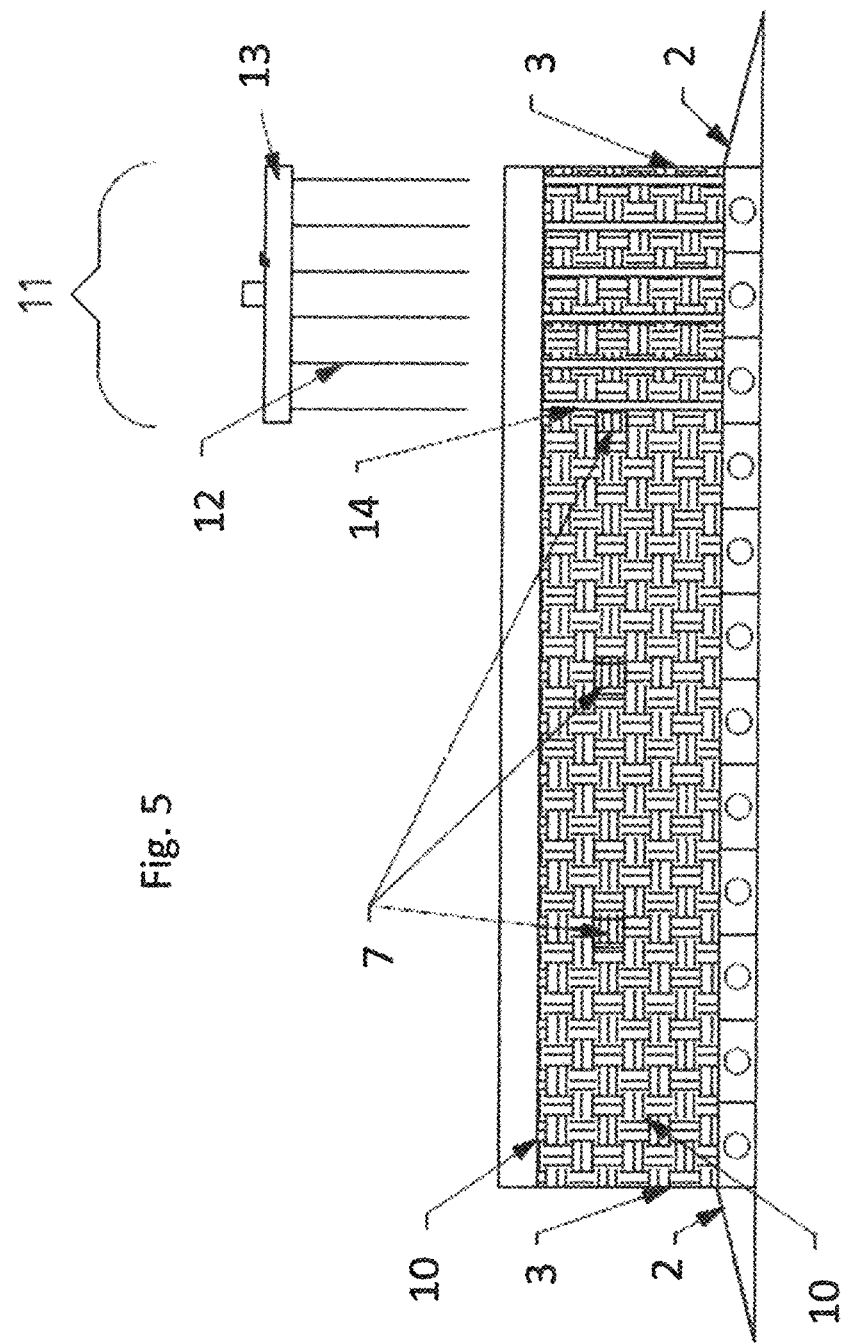
Figure 6:
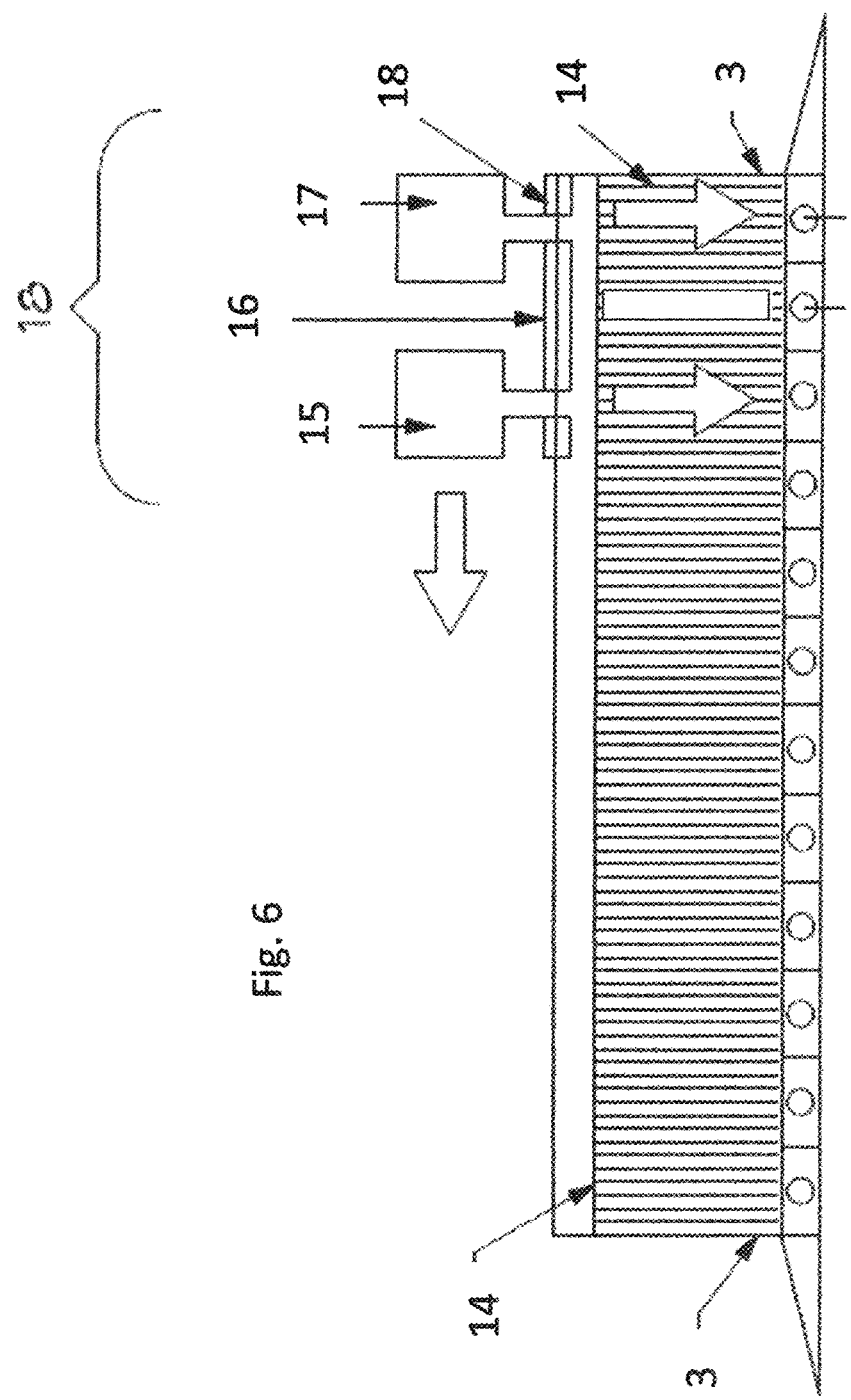
Figure 7:
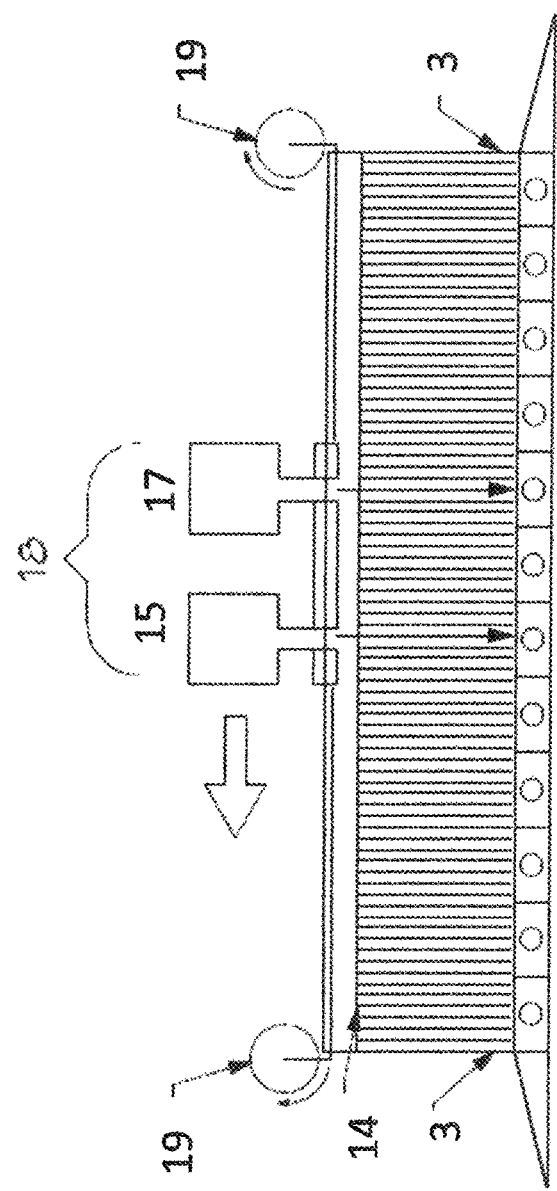
Figure 8:
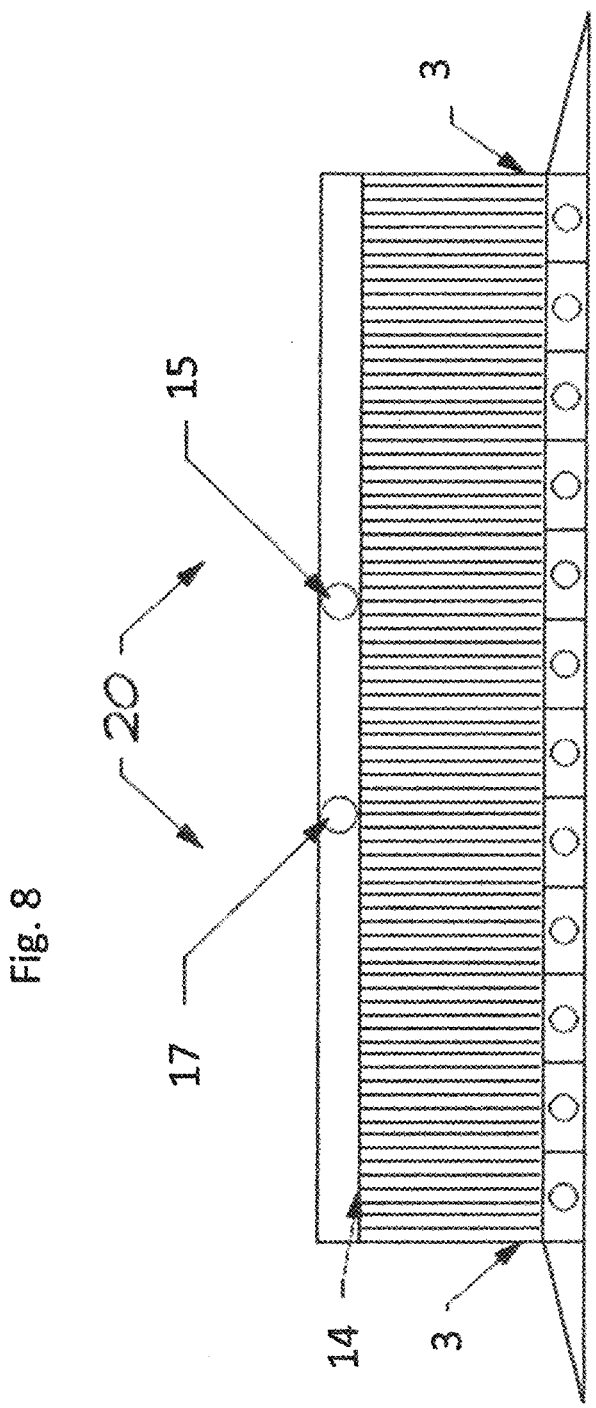
Figure 9:
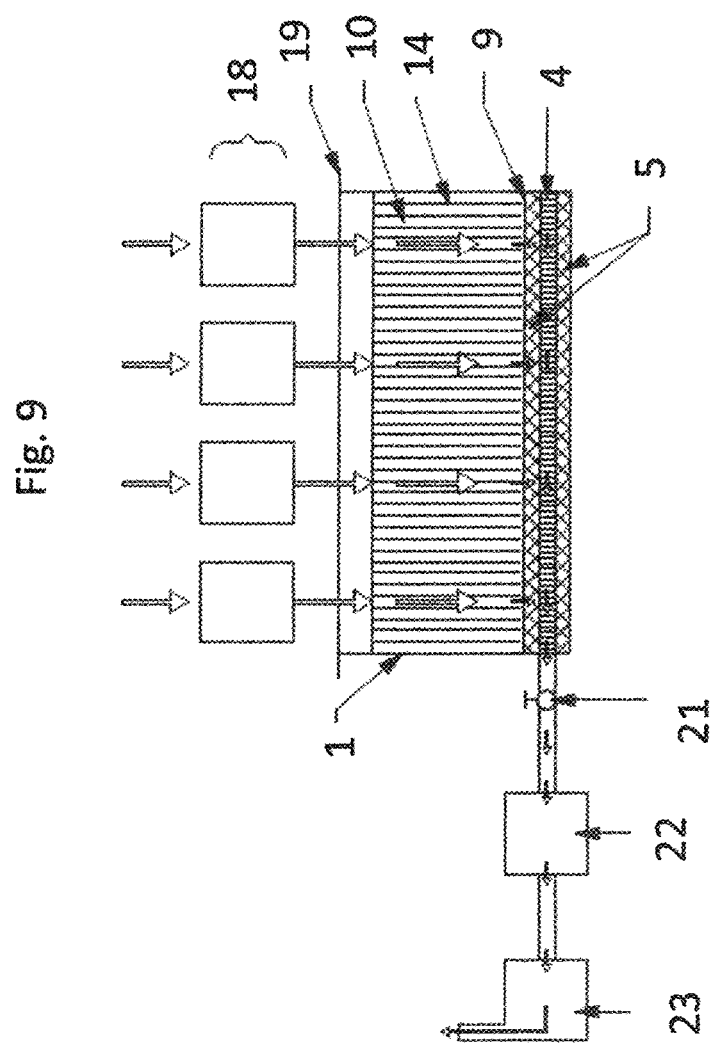
Figure 10:
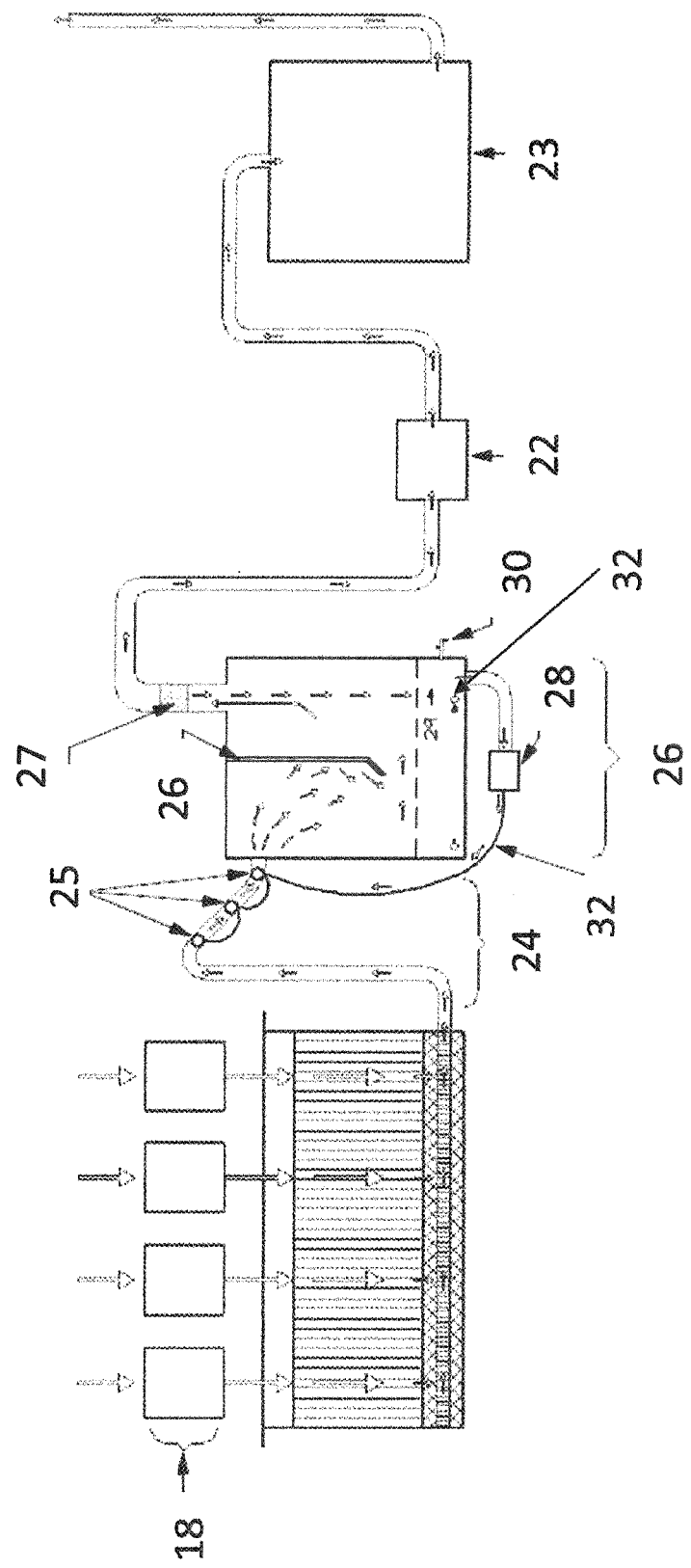
Figure 11:
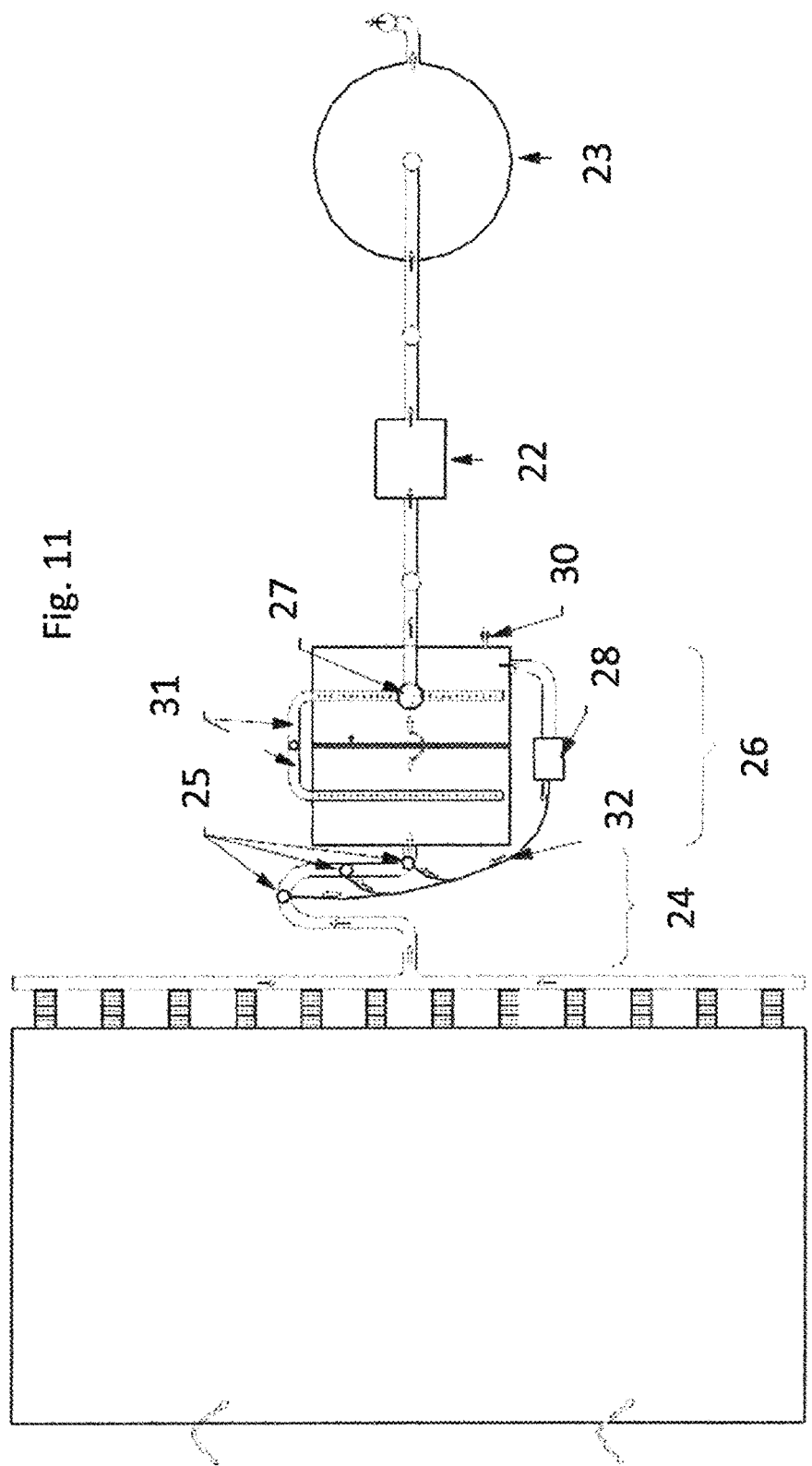
Figure 12:
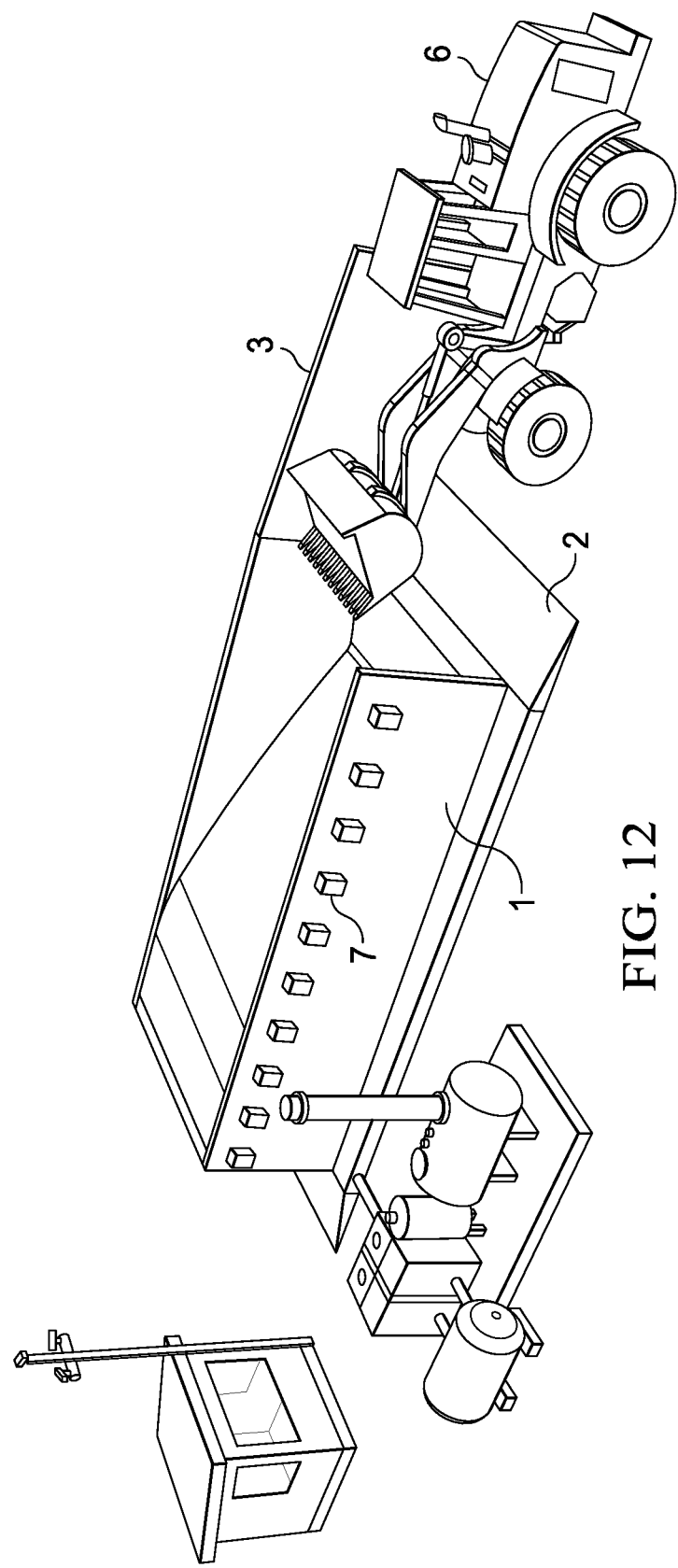
Figure 13:
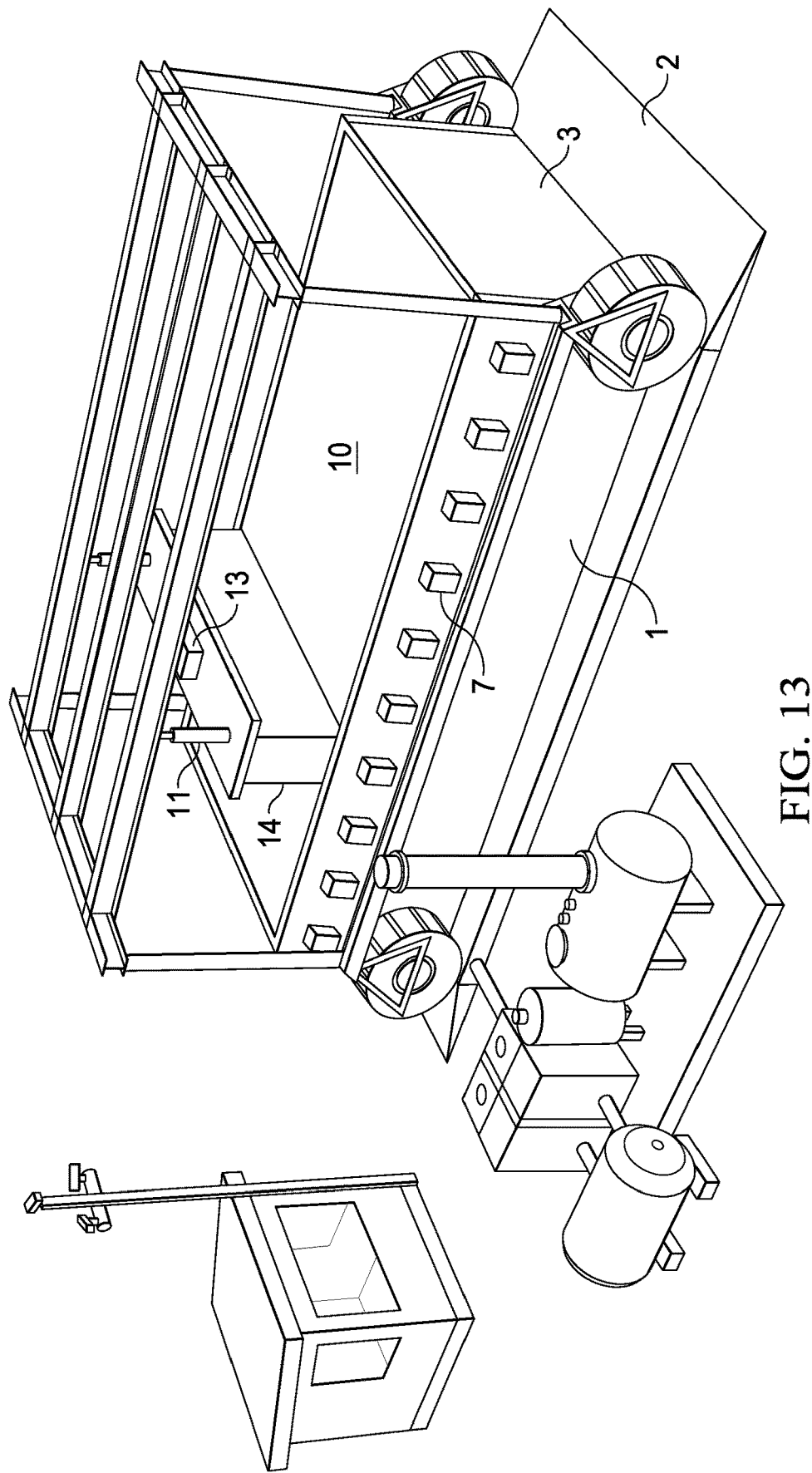
Figure 14:
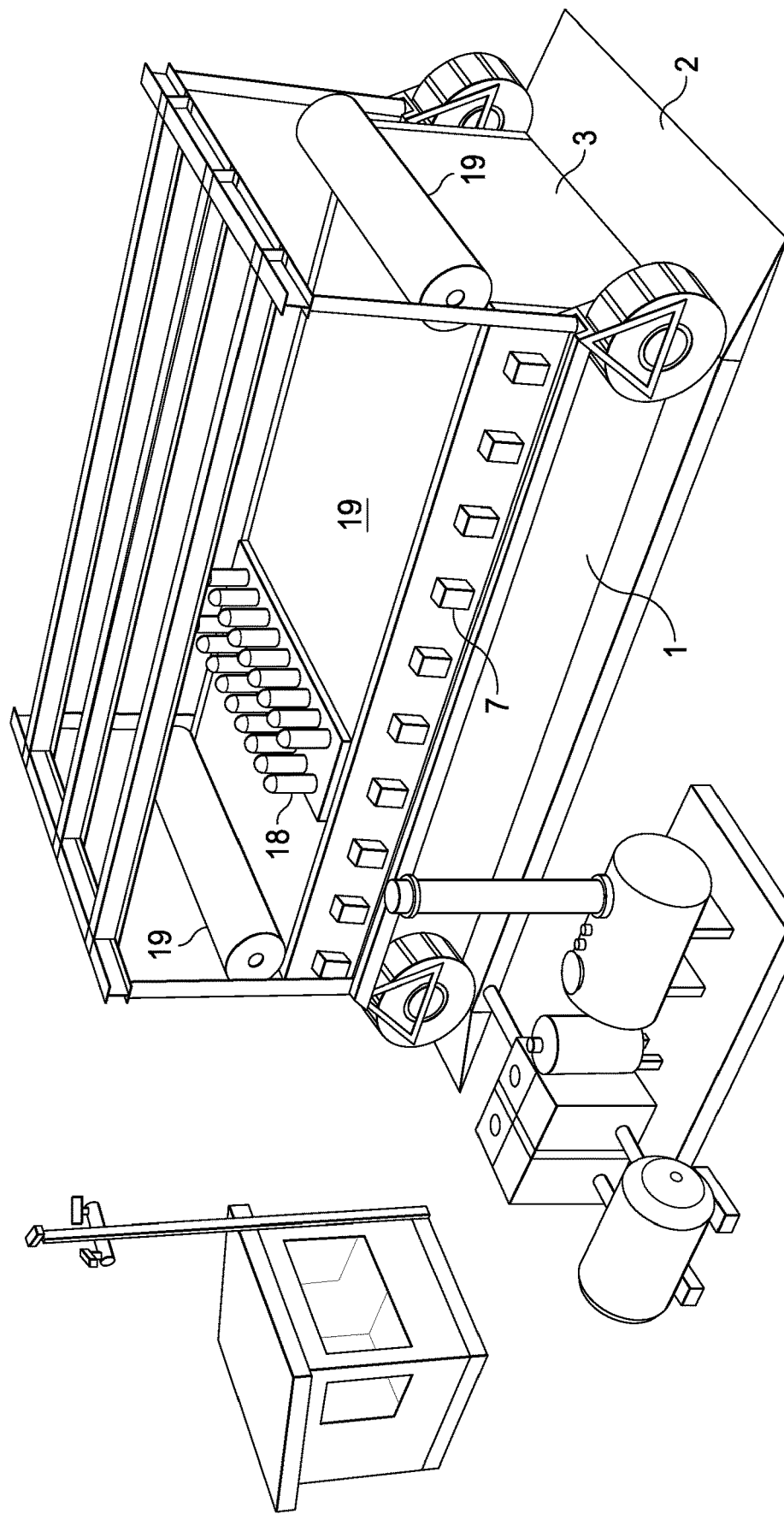

1. FIG. 1, 1 Sinter Craft Wall
2. FIG. 1, 2 Sinter Craft Access Ramp
3. FIG. 1, 3 Sinter Craft Access Door
4. FIG. 1, 4 Sinter Craft subfloor extraction line (typical)
5. FIG. 1, 5 Sinter Craft subfloor sectionalized extraction line chamber
6. FIG. 1, 6 Wheel Loader
7. FIG. 2, 1 Sinter Craft Wall
8. FIG. 2, 3 Sinter Craft Access Door (Swing Door)
9. FIG. 2, 4 Sinter Craft Subfloor Extraction Line
10. FIG. 2, 5 Sinter Craft Subfloor Sectionalized Extraction Line Chamber
11. FIG. 2, 7 Sinter Craft Wall Vibrators
12. FIG. 3, 4 Sinter Craft Subfloor Extraction Line
13. FIG. 3, 8 Sinter Craft Subfloor Extraction Line Chamber Wall
14. FIG. 3, 3 Sinter Craft Access Door
15. FIG. 3, 2 Sinter Craft Access Ramp
16. FIG. 4, 9 Sinter Craft Rail Floor
17. FIG. 5, 10 Sintered (Densified) Soil Bed
18. FIG. 5, 11 Shaping Headworks
19. FIG. 5, 12 Hole Punch Rod Hexagon Shape
20. FIG. 5, 13 Shaping Headworks Vibrator
21. FIG. 5, 14 Punched Holes in Soil Bed from Top to Floor
22. FIG. 6, 15 Inert Wave Injection Port 23. FIG. 6, 16 Non-Active Treatment Zone (Elevated Temperature Soak)
24. FIG. 6, 17 Ambient Wave Injection Port
25. FIG. 6, 18 ISA (Inert, Soak, Ambient) Unit
26. FIG. 7, 18 ISA (Inert, Soak, Ambient) Unit
27. FIG. 7, 19 Sinter Craft Flex Steel Moving Cover
28. FIG. 8, 20 Alternate Embodiment Headspace Heat Application
29. FIG. 9, 21 Valve to isolate treatment to narrow zone
30. FIG. 9, 22 Vacuum Blower
31. FIG. 9, 23 Vapor Treatment (carbon adsorption, catalytic oxidation, thermal oxidation or other treatment)
32. FIG. 10, 24 Cooling Chase for PFAS condensation
33. FIG. 10, 25 Spray Rings that deliver high pressure water fans directly into the vapor stream in the cooling chase.
34. FIG. 10, 26 Fluorinated Compound Condensation Unit (FCCU) collects condensed PFAS and removes water mists from the vapor stream via baffles and a demister tower exit.
35. FIG. 10, 27 Demister Screen removes residual water mist in the demister tower exit.
36. FIG. 10, 28 Jet Pump recirculates water from the FCCU and delivers the water to the spray rings in the cooling chase.
37. FIG. 10, 29 Cooling Water circulates between the FCCU and the cooling chase to condense PFAS. The cooling water maintains a temperature above ambient temperatures to prevent water condensation while at the same time allows PFAS condensation.
38. FIG. 10, 30 Recirculation Water Sample Port allows water samples to be collected and analyzed for PFAS concentration.
39. FIG. 10, 31 Purge Pipes when activated can introduce air into the cooling water to evaporate the water that allows lower detection levels of PFAS. The purge pipes have a valve that can be opened to the atmosphere; when the induction blower is on the valve draws air into the cooling water
40. FIG. 10, 32 High Pressure Water Line delivers recycled cooling water to spray rings in cooling chase.
41. FIG. 10, 22 Induction Blower draws treatment vapors from the Sinter Craft through the vapor treatment system and blows the vapors through a granular activated carbon vessel.
42. FIG. 10, 23 Granular Activated Carbon Vessel serves as the final vapor stream treatment prior to discharge to the atmosphere.
43. FIG. 11, 24 Cooling Chase for PFAS condensation
44. FIG. 11, 25 Spray Rings that deliver high pressure water fans directly into the vapor stream in the cooling chase.
45. FIG. 11, 26 Fluorinated Compound Condensation Unit (FCCU) collects condensed PFAS and removes water mists from the vapor stream via baffles and a demister tower exit.
46. FIG. 11, 27 Demister Screen removes residual water mist in the demister tower exit.
47. FIG. 11, 28 Jet Pump recirculates water from the FCCU and delivers the water to the spray rings in the cooling chase.
48. FIG. 11, 29 Cooling Water circulates between the FCCU and the cooling chase to condense PFAS. The cooling water maintains a temperature above ambient temperatures to prevent water condensation while at the same time allows PFAS condensation.
49. FIG. 11, 30 Recirculation Water Sample Port allows water samples to be collected and analyzed for PFAS concentration.
50. FIG. 11, 31 Purge Pipes when activated can introduce air into the cooling water to evaporate the water allowing a lower detection level for PFAS. The purge pipes have a valve that can be opened to the atmosphere; when the induction blower is on the valve draws air into the cooling water.
51. FIG. 11, 32 High Pressure Water Line delivers recycled cooling water to spray rings in cooling chase.
52. FIG. 11, 22 Induction Blower draws treatment vapors from the Sinter Craft through the vapor treatment system and blows the vapors through a granular activated carbon vessel.
53. FIG. 11, 23 Granular Activated Carbon Vessel serves as the final vapor stream treatment prior to discharge to the atmosphere.
54. FIG. 12, 1 Sinter Craft Walls
55. FIG. 12, 2 Sinter Craft Access Ramp
56. FIG. 12, 3 Sinter Craft Access Door
57. FIG. 12, 6 Wheel Loader
58. FIG. 12, 7 Sinter Craft Walls
59. FIG. 13, 1 Sinter Craft Walls
60. FIG. 13, 2 Sinter Craft Access Ramp
61. FIG. 13, 3 Sinter Craft Access Door
62. FIG. 13, 10 Densified (Sintered) Soil Bed
63. FIG. 13, 7 Sinter Craft Wall Vibrators
64. FIG. 13, 11 Shaping Headworks
65. FIG. 13, 13 Shaping Headworks Vibrator
66. FIG. 13, 14 Punched Hoels or Slots in Sintered Soil Bed
67. FIG. 14, 1 Sinter Craft Walls
68. FIG. 14, 2 Sinter Craft Access Ramp
69. FIG. 14, 3 Sinter Craft Access Door
70. FIG. 14, 7 Sinter Craft Wall Vibrators
71. FIG. 14, 18 Inert-Soak-Ambient (ISA) Treatment Gas Unit
72 FIG. 14, 19 Sinter Craft Flex Steel Rolling Cover

DETAILED DESCRIPTION OF INVENTION

This invention relates to a process and apparatus for sequential desorption (via hot air/ambient or inert, cold air/ambient or inert, steam or aqueous solutions) of contaminants from a porous media such as a mixture of soil and rocks, sediments or other porous media using an automated formed container (static) arrangement. The automated formed container arrangement takes advantage of the deformable nature of porous media to sinter (densify) and shape (placement of shaped holes or slots) the media within a specially constructed vessel (Sinter Craft) to facilitate sequential sectionalized treatment. The Sinter Craft is an excavation equipment (wheel loader, backhoe, scraper, clamshell, dredging or similar equipment) compatible device allowing easy entry and exit into the vessel for loading and unloading porous media. The Sinter Craft can be used on land or on the water for sediment treatment during dredging operations. The Sinter Craft has vibrators mounted to the sides of the vessel to initiate the sintering process where the entire loaded Sinter Craft will vibrate causing the porous media to densify and expel water and air to the bed surface. Specially shaped holes or slots are pressed into the densified bed and advanced to the floor of the Sinter Craft. The Sinter Craft floor is sectionalized into small compartments where extraction lines (vapor or aqueous) are oriented perpendicular to the length of the Sinter Craft. Once the Sinter Craft is sealed, treatment gases or aqueous solutions are introduced over each narrow section in a sequential manner (one section at a time). Each extraction line draws the treatment gases or aqueous solutions through the sintered shaped media at high velocities within each individual section (one section at a time). The treatment gases or aqueous solutions containing the desorbed contaminants are extracted and delivered to a commercially available treatment device such as carbon adsorption, catalytic oxidation, thermal oxidation and in some cases condensation. For PFAS contaminated soils a special vapor cooling system condenses the majority of the compounds into water with residual contaminants removed through vapor phase granular activate carbon.

The Sinter Craft is equipped with a double wave sequential treatment capability for high concentration applications and PFAS nondestructive removal applications. The treatment apparatus moves over the top of the sintered and shaped soil mass. For hydrocarbons, the first and second waves consist of a narrow band of high velocity hot air situated directly above a sectionalized extraction line; the hot air pathway propagates directly from injection point directly downward through the holes/slots in the soil bed to the extraction point. The wave moves sequentially across the sintered and shaped soil bed. There is a non-active treatment zone located between the first and second waves designed to allow the soil to remain at temperature before the final second high velocity narrow band of hot air. For PFAS removal the first wave consists of a narrow band of high velocity hot air situated directly above a sectionalized extraction line. There is a similar non-active treatment zone followed by a final wave consisting of ambient temperature air to cool the soil causing the cristobalite sudden volumetric change between 365 F to 419 F.

For hydrocarbons, the first wave consists of an inert treatment gas with oxygen concentrations below 10% at temperatures ranging from 800 F to 1,400 F (inert wave). The purpose of the inert wave is to significantly reduce the contaminant concentrations in a safe manner without causing high temperature oxidation and pyrolysis within the porous media. Each section will be treated one at a time and move sequentially forward within the Sinter Craft. The area of media between the first and second wave is a soak area where the heated soil stays hot until the arrival of the second wave. Soil is a poor conductor of heat and will stay at treatment temperature awaiting the second wave with no external input of energy. This heated residence time takes advantage of the low thermal conductivity of soil/porous media, which saves energy costs. The residence time of the soak zone is an integral part of the treatment process.

The second wave consists of using ambient air, approximately 21% oxygen, (ambient wave) heated to temperatures ranging from 800 F to 1,400 F. The purpose of the ambient wave is twofold; first, the temperature curve and treatment gas chemistry are monitored to determine if significant concentrations of contaminants remain. Steep temperature rise or generation of carbon monoxide are indicators of high concentrations of contaminants remaining in the soil bed. Carbon monoxide is typically generated as acetone and methylethylketone (MEK) is generated during soil heating. When the carbon monoxide generation curve diverges from the acetone and MEK generation curve, a high temperature oxidation and pyrolysis reaction is about to take place, which indicates residual contamination is present in the soil bed. If early indications of oxidation/pyrolysis are measured, the Sinter Craft hot air injection assembly will automatically reverse and retreat the area with the inert wave; this is a self-diagnostic regenerative wave system. The second purpose of the ambient wave is to decarbonize the porous media, which brings the media back to its original color.

The heat source for the inert and ambient wave are electrical resistance heaters. The temperature of the heat is maintained below the auto formation temperature of common greenhouse gases such as Nox and Sox.

For PFAS removal the first wave consists of a narrow band of high velocity hot ambient air (21% oxygen). PFAS are not flammable and were historically used as aqueous film forming foam (AFFF firefighting foam); no need for inert treatment gases. Each section of soil is heated sequentially to over 400 F, which is above the boiling temperatures of PFAS and beyond the sudden cristobalite volumetric reduction during heating (due to a low temperature quartz inversion from alpha to beta crystal structure). The final ambient air rinse causes cristobalite volume to suddenly increase, which squeezes out any residual PFAS vapors.

Treatment gases laden with PFAS are water cooled in a chase work (water sprayed into the vapor stream), then routed through a tank equipped with baffles to remove any water entrainment in the vapor stream. A demister screen located at the top of a tower mounted on the tank removes any residual water mists prior to the induction blower. Off gases are routed from the induction blower to a vessel of granulated activated carbon for final vapor treatment.

The cooling chase work uses water recycled from the tank. The recycled water gradually increases in temperature to a maximum of 140 F, which maintains the vapor temperature above ambient temperatures preventing water condensation within the tank while at the same time allowing PFAS to condense in the cooling water. The water in the tank condenses out the majority of the PFAS where it can be measured in the field to estimate contaminant concentration removed per treatment batch. Water samples can be analyzed by measuring the dynamic surface tension in the field or submitted to an offsite analytical laboratory. The water in the tank can be treated with granular activated carbon or reverse osmosis between soil treatment batches to remove the PFAS.

The present invention can be categorized as a thermal desorption technique applied to a static configuration of soil in batch process using a Sinter Craft. FIG. 1 presents a general arrangement wheel loader loading Sinter Craft. The Sinter Craft is a vessel with walls (1), access ramps (2) and swing doors (3). The Sinter Craft accommodates direct loading and unloading by allowing earth moving devices (6) to enter and exit into the vessel using the access ramps (2) and access doors (3). The access doors are closed at the conclusion of loading the Sinter Craft. FIG. 12 presents a perspective view of a Sinter Craft being loaded with a wheel loader. The floor of the Sinter Craft consists of extraction lines (4) placed in sectionalize extraction line chambers (5).

The Sinter Craft is an automated pile arrangement that does not require labor intensive setup and disassembly. FIG. 2 presents a Sinter Craft cross section. The Sinter Craft conditions the soil bed to allow for effective treatment by sintering (densification) through the use of vibrators (7) mounted on the Sinter Craft walls (1). The vibration is adjusted to match the harmonics of the soil bed where fluids and air are expelled from the soil bed. Densified soil facilitates capillary flow through reduction of pore throat diameters, expelling soil vapor, and creating a saturated or near saturated condition, which capitalizes on the fluid/water cohesion theory. In addition, the presence of PFAS causes surface tension to be reduced. In accordance with the Law of Laplace, internal pressure is equalized within a variety of pore throat diameters due to the surfactant nature of PFAS.

FIG. 3 presents the Sinter Craft Subfloor Map View. An integral component to the system automation is the subfloor.

Extraction lines (3) are placed in sectionalized extraction line chambers (4) perpendicular to the Sinter Craft walls (1) and graded sand or other porous filter media is placed around the extraction lines to provide a filter pack. The sectionalized extraction line chamber consists of chamber walls (8) separating the extraction lines. FIG. 4 presents the Sinter Craft Floor Map View. The Sinter Craft floor consists of rails (9) running parallel to the Sinter Craft walls (1). The rails provide a durable surface for the wheel loader (6) to drive upon and also provides a hard surface for the wheel loader (6) bucket to glide upon.

The bed is then shaped (specially shape holes or slots advanced from top to the bottom of the sintered soil bed). FIG. 5 presents the Sinter Craft Head Works Shaping (11). FIG. 13 presents a perspective view of the sintering and shaping operation. The head works (11) consists of a plate with a vibrator (13) and a network of hexagonal rods (12) used to press holes or slots into the densified soil bed (14) all the way to the Sinter Craft floor (9). The head works can also be placed in the Sinter Craft prior to soil loading where soil is placed over the top of the head works/rods. After sintering (densification) the head works/rods can be removed leaving behind the holes or slots in the dense soil bed.

The sintered and shaped soil bed can be treated with hot air/ambient or inert, cold air/ambient or inert, steam or aqueous solutions. This invention takes advantage of the deformable nature of soil and the low of thermal conductivity, which is unique as it forms and shapes the soil in an automated way to facilitate effective, safe and efficient treatment on a large scale. Further, the treatment gases are moved through the open channels in the densified soil bed rather than moving through the soil under porous flow conditions.

The basic principle of water/contaminant transport with the Sintered Wave Technology is similar to how a tree functions; the sintering and shaping replicates the functions observed in trees. All prior art desorption technologies rely on increasing permeability to allow increased air flow through the porous media for effective treatment. The Sintered Wave Technology does not rely on increasing soil permeability for effective treatment; it relies on capillary flow within the soil and open channel flow through the holes or slots placed within the densified soil bed.

Porosity is the measure of void space within porous media. Permeability is the measure of how fast fluids or air moves through the porous media. Fine grain soils have exponentially higher surface area than coarser grained soils, which typically result in high porosity with low permeability (high fluid content that cannot move through the media very fast). Wet fine soils are notoriously difficult to treat because current thinking attempts to change the nature of the saturated fine-grained soil for treatment. The Darcy equation predicts flow through porous media when the capillary forces are exceeded. Fluids held in capillary action is typically where contaminants are held in the porous media. Contaminants only flow in accordance with Darcy's Law when the capillary forces are exceeded. The Darcy equation does not address fluids held in capillary action in a meaningful way. The most cost-effective method to remove contaminants held in capillary action is to use capillary action to remove the contaminants. This concept changes the generally accepted practice of contaminant transport in porous media. The Sintered Wave Technology uses a completely different modality of contaminant transport than other technologies. The Sintered Wave uses enhanced capillary flow as the primary means of contaminant transport within the soil or porous media. This concept allows treatment of all soil types.

As an example, trees use static structures and shapes to promote capillary flow. Fluids can only be drawn to a height of 32 feet under a perfect vacuum, which is 1 atmosphere. At 1 atmosphere water will boil at room temperature. Most trees exceed 32 feet in height; some trees grow to 300 feet. The leaf is the engine for fluid flow within a tree. Water evaporates from the leaf, which draws fluid up from the roots to the leaf level without boiling. Vacuums of up to 15 atmospheres have been measured within leaves with no boiling. Trees extract thousands of gallons a day during hot windy days when the drying forces are at their maximum. The unique aspect in trees that allow fluid flow to great heights is the fact that the static structures and shapes do not have any fluid/air interfaces. The structures are completely filled with fluid uninterrupted from the root tips to the tree top. As the tree grows, the tree cells are formed completely filled with fluid. The absence of air/fluid interface within the static structures is the key to allow flow from the roots to the leaf level. The cohesion theory of water describes how water molecules will stick to other water molecules. The combination of fluid filled structures and the cohesion theory of water is the reason water can be extracted at the roots of a tree and transported to the leaf level. The tree expends to energy in water transport; it relies on its own fluid filled structures and shapes. The molecular weight of sap varies between tree species from low molecular weight to high molecular weight saps.

The Sintered Wave technology concept prepares the soil bed in a way to simulate the structure of a tree. The soil bed is vibrated to densify the soil bed making the soil pores smaller to facilitate capillary flow. The vibration also removes air from the soil bed. Liquid will migrate to the top of the soil bed during vibration, which indicates the soil bed pore spaces are completely filled with fluid. In order to simulate the leaf structure, the sintered soil bed is shaped with hexagon shaped holes or slots throughout the sintered bed. As an alternative shape, slots containing 120 degree angles can be used in place of the hexagonal holes. The hexagon shape offers multiple angles of 120 degrees, which attracts fluid via capillary flow. Studies have shown 120 degrees causes capillary flow along these angles.

High velocity hot air moving through holes or slots within a sintered soil bed creates various gradients that are beneficial to enhanced capillary flow. The high velocity air flow creates steep thermal gradients, steep moisture gradients, steep osmotic gradients and steep velocity gradients. All of these gradients enhance capillary flow from the soil to the open hot air flow channel.

FIG. 6 presents the Sinter Craft Air Injection Head Works. FIG. 14 presents a perspective view of Active Inert Wave, Soak Zone and Ambient Wave (ISA) Treatment. The sintered and shaped bed inside the Sinter Craft sits on sectionalized extraction lines (4) perpendicular to the loading drive path. These sectionalized extraction lines work in conjunction with narrow high velocity hot air injection jets. The Inert-Soak-Ambient (ISA) assembly (18) provides the narrow bands of high velocity hot air.

Each section is treated individually with hot air injection above one extraction line while the extraction line extracts the hot air exiting the bottom of the sintered bed through the hexagonal holes or slots. Each extraction line draws the treatment gases through the sintered shaped media at high velocities within each individual section (one section at a time). Using a narrow sectional treatment (inert and ambient) allows intrinsically safe extraction of flammable substances and avoids unnecessary heating of previously treated soils. The treatment gases containing the desorbed contaminants are extracted and delivered to a commercially available treatment device such as carbon adsorption, catalytic oxidation, thermal oxidation and in some cases condensation.

FIG. 7 presents the Sinter Craft Air Injection Sled Top Cover Embodiment. The ISA assembly (18) moves sequentially across the top of the Sinter Craft. The top of the Sinter Craft is sealed with a steel flex roll (19). The roll (19) moves the ISA Assembly (18) across the top of the Sinter Craft.

FIG. 8 presents the Sinter Craft Fixed Cover/Head Space Heat Application Embodiment where the treatment gases are introduced above the sintered and shaped soil bed (20). The extraction lines are operated in a sequential manner. Hot inert air is introduced to the head space where the extraction lines draw the treatment gases to each extraction line one section at a time. Hot ambient air is then introduced where the sequential extraction is repeated.

FIG. 9 presents the Sinter Craft Cross Section General Treatment Airflow. The ISA unit (18) is shown along with the steel roll flex cover (19) at the top of the Sinter Craft. Inert or ambient air enters the ISA unit (18), is heated and is injected below the steel roll flex cover (19). The treatment gas occupies the space above the sintered (densified) soil bed (10) and is drawn through the holes or slots (14) placed within the sintered soil bed. The treatment gases are then drawn through the Sinter Craft floor (9) to the slotted extraction line (4) and sectionalized vapor extraction chamber (5). The treatment gases move through an isolation valve (21) in route to the vacuum blower (22). The isolation valve (21) isolates treatment gas extraction to the extraction line that is located directly below the ISA unit (18). Valves (21) open and close as the ISA unit (18) moves from sectionalized extraction chamber (5) to to sectionalize extraction chamber (50) in sequence.

The Sinter Craft is equipped with a double treatment gas wave treatment capability where two different electrically-heated treatment gases are applied sequentially to the sintered and shaped soil bed. The treatment gas apparatus moves over the top of the sintered and shaped soil mass applying treatment gas through the open holes or slots one section at a time, working in concert with sectionalized vapor extraction lines to draw the treatment gas out of the bed and into a vapor treatment system. The heat sources for the treatment gas are electrical resistance heaters. The temperature of the heat is maintained below the auto formation temperature of common greenhouse gases such as Nox and Sox.

For high concentration organics with concentrations exceeding 20.00 mg/kg, the first wave consists of an electrically-heated inert treatment gas with oxygen concentrations below 10% at temperatures ranging from 800 F to 1,300 F (inert wave). The purpose of the inert wave is to significantly reduce the contaminant concentrations in a safe manner without causing high temperature oxidation and pyrolysis within the porous media. Each section will be treated one at a time and moved sequentially forward within the Sinter Craft. The area of media between the first and second wave is a soak area where the heated soil stays hot until the arrival of the second wave. Soil is a poor conductor of heat and will stay at treatment temperature awaiting the second wave with no external input of energy. This heated residence time takes advantage of the low thermal conductivity of soil/porous media, which saves energy costs. The residence time of the soak zone is an integral part of the treatment process.

The second wave consists of electrically heated ambient air, approximately 21% oxygen, at temperatures ranging from 800 F to 1,300 F (ambient wave). The purpose of the ambient wave is twofold: First, the temperature curve and treatment gas chemistry are monitored to determine if significant concentrations of contaminants remain. Steep temperature rise or generation of carbon monoxide are indicators of high concentrations of contaminants remaining in the soil bed. Carbon monoxide is typically generated as acetone and methylethylketone (MEK) is generated during soil heating. When the carbon monoxide generation curve diverges from the acetone and MEK generation curve, a high temperature oxidation and pyrolysis is about to take place, which indicates residual contamination is present in the soil bed. If early indications of oxidation pyrolysis are measured, the Sinter Craft treatment gas injection assembly will automatically reverse and retreat the area with the inert wave; this is a self-diagnostic regenerative wave system. The second purpose of the ambient wave is to decarbonize the porous media, which brings the media back to its original color.

A final treatment consists of unheated ambient air applied to the sintered and shaped soil bed to cool the soil. This invention has the ability to cool the soil bed to prevent unintended compound formation (like acetone/MEKI described above) or to cause the Cristobalite sudden volumetric change at 365 F to 419 F. Cristobalite is a quarts polymorph present in clay bodies that has a trigonal crystal structure at ambient temperatures. One leg of the crystal lattice stretched causing the trigonal crystal arrangement. As Cristobalite is heated, it gradually increases in size. Once heated between 365 F and 419 F, Cristobalite changes to a cubic crystal system and experiences a sudden 0.8% volume reduction resulting in the opening of additional void space in the soil bed. Cooling the soil bed reverses the volumetric change rapidly decreasing void space pushing out any vaporized contaminants in the process.

Treatment of organics less than 20.000 mg/kg and any concentration of PFAS consists of the ambient wave only followed by an unheated ambient air rinse.

The sequential wave system (inert wave, non-active soak and ambient wave) is a precise treatment procedure that accommodates cumulative energy savings in a large-scale situation. Cumulative excesses in energy use over large volumes add up to significant costs. Precision is a critical factor in large scale operations.

The Sinter Craft arrangement can be scaled to accommodate large volumes of contaminated soil. Both ends of the Sinter Craft can open to accommodate earth scrapers entry and exit without stopping. Smaller Sinter Crafts can be connected together accommodating larger treatment batches.

The Sinter Craft can also serve as a contained storage for volatile organic soils, which is of importance in restrictive air basins and urban areas.

PFAS are emerging contaminants that contaminate soil and groundwater. At times, PFAS contaminate soil and groundwater that were contaminated with petroleum hydrocarbons. PFAS were historically a component of firefighting foam (AFFF). The Sintered Wave Technology is a multi-purpose tool that can treat a variety of porous media waste streams. This invention can remove hydrocarbons at the same time as PFAS or it can simply remove PFAS alone.

The PFAS removal process is similar to what has been described above with the exception of the narrow band of high velocity air (waves) are changed to facilitate PFAS nondestructive removal. Ambient hot air (21% oxygen) is used as the initial wave, followed by a soak zone then followed by an ambient air-cooling wave. This invention has the ability to cool the soil bed to prevent unintended compound formation (like acetone/MEK described above) or to cause the Cristobalite sudden volumetric change at 365 F to 419 F. Cristobalite is a quartz polymorph present in clay bodies that has a trigonal crystal structure at ambient temperatures. One leg of the crystal lattice is stretched causing the trigonal crystal arrangement. As Cristobalite is heated, it gradually increases in size. Once heated between 365 F and 419 F, Cristobalite changes to a cubic crystal system and experiences a sudden 0.8% volume reduction resulting in the opening of additional void space in the soil bed. At this temperature, PFAS are above their boiling temperature. When the soil bed is cooled to below 365 F there is a sudden volume increase, which decreases void space within the soil bed expelling any residual PFAS vapors.

This invention has a Fluorinated Compound vapor treatment arrangement to condense and capture PFAS and related compounds. Current thinking calls for extremely high temperatures (1,800 F-2,000 F) to destroy PFAS compounds such as PFOS/PFAS. This invention does not seek to destroy these compounds on site but rather condense them for offsite disposal or destruction. By not thermally destroying the PFAS and related compounds, no NOx, Sox or HF are produced from the treatment process on site. FIG. 10 presents a General Cross Section of the Fluorinated Compound Treatment Arrangement. As PFAS vapors are drawn from the Sinter Craft by the Induction Blower (22), the vapors are pulled through a variety of systems to condense out PFAS. PFAS vapors are cooled in a Cooling Chase (24) by direct water spray from the Spray Rings (25). The water spray and vapors are then drawn into the FCCU (26) where the water, water mists and PFAS accumulate at the bottom of the FCCU (26). Baffles in the FCCU knock out the majority of the water mists. A Demister Screen (27) located at the top of a demister tower exit from the FCCU (26) removes residual water mists. The Jet Pump (28) located at the bottom of the FCCU (26) recirculates the Cooling Water (29) and delivers the water through a High Pressure Water Line (32) to the Spray rings (25) in the Cooling Chase (24). A Sample Port (30) located in the FCCU (26) allows sample collection of the Cooling Water (29) for field foam analysis or off-site laboratory analysis. Purge lines (31) at the bottom of the FCCU (26) allow air to be drawn from the atmosphere when the Induction Blower (22) is operating, which evaporates the water allowing lower detection limits of PFAS in the field. On the pressure side of the Induction Blower (22) vapors are routed through a granular Activated Carbon Vessel (23) for final treatment prior to discharge to the atmosphere.

I claim:

1. A method of treating porous media, comprising:
   depositing the porous media in a sealable sintering vessel having a first side and a second side;
   densifying the deposited porous media using vibration to form a sintered media bed;
   forming a plurality of vertical channels in the sintered media bed, each vertical channel extending from an upper surface of the sintered media bed to a lower surface of the sintered media bed;
   sealing the sealable sintering vessel;
   formally dividing the sintered media bed into a plurality of vertical sections extending from a first end of the sealable sintering vessel to a second end of the sealable sintering vessel, each of the vertical sections extending from the upper surface of the sintered media bed to the lower surface of the sintered media bed, and from the first side of the sealable sintering vessel to the second side of the sealable sintering vessel, so that each of the vertical sections encompasses a plurality of the vertical channels formed in the sintered media bed;
   selecting a first vertical section of the plurality of vertical sections of the sintered media bed at a first end of the sealable sintering vessel, and passing a heated gas through the formed vertical channels encompassed by the first vertical section; and
   passing the heated gas through the formed vertical channels encompassed by each of the remaining vertical sections of the plurality of vertical sections of the sintered media bed in sequence from the first end of the sealable sintering vessel to the second end of the sealable sintering vessel.

2. The method of claim 1, wherein the porous media includes one or more of soil, gravel, rocks, and sediments.

3. The method of claim 1, wherein passing the heated gas through the formed vertical channels of the plurality of vertical sections of the sintered media bed includes passing a first heated gas having less than 10% oxygen at a temperature of 800° F. to 1,100° F. through the formed vertical channels of the plurality of vertical sections of the sintered media bed.

4. The method of claim 3, further comprising permitting each of the plurality of vertical sections of the sintered media bed to rest without additional heating or gas flow after that vertical section of the sintered media bad has been heated by passage of the first heated gas.

5. The method of claim 4, further comprising passing a second heated gas through the formed vertical channels of at least one of the plurality of vertical sections of the sintered media bed after the at least one vertical section has rested, where the second heated gas includes about 21% oxygen at a temperature of 800° F. to 1,100° F.

6. The method of claim 5, wherein passing the heated gas through the formed vertical channels of each of the plurality of vertical sections of the sintered media bed includes passing the heated gas through the formed vertical channels from the upper surface of the sintered media bed to the lower surface of the media bed, and collecting the heated gas passed through the sintered media bed at the lower surface of the media bed.

7. The method of claim 6, wherein collecting the heated gas passed through the sintered media bed at the lower surface of the media bed includes drawing the heated gas passed through the sintered media bed into one or more lateral extraction lines in a floor of the sealable sintering vessel using a vacuum blower.

8. The method of claim 7, further comprising passing the collected heated gas that passed through the sintered media bed through a vapor treatment unit capable of removing organic compounds from the collected heated gas that passed through the sintered media bed.

9. The method of claim 8, wherein treating the porous media includes removing one or more of petroleum, solvents, polychlorinated biphenyls, and per- or polyfluoroalkanes from the sintered media bed.

10. The method of claim 1, wherein forming the plurality of vertical channels in the sintered media bed includes forming a plurality of vertical channels, wherein the plurality of vertical channels are vertical slots, or have a horizontal cross-section that defines one or more internal 120° angles.

11. The method of claim 1, wherein forming the plurality of vertical channels in the sintered media bed includes forming a plurality of vertical channels having a horizontal cross-section that is a regular hexagon.

12. A method of nondestructive removal of per- and polyfluoroalkyl substances (PFAS) contaminants from soil, comprising:
- depositing soil that contains or is thought to contain PFAS contaminants in a sealable sintering vessel having a first side and a second side;
- densifying the deposited soil using vibration to form a sintered soil bed;
- forming a plurality of vertical channels in the sintered soil bed, each vertical channel extending from an upper surface of the sintered soil bed to a lower surface of the sintered soil bed;
- sealing the sealable sintering vessel;
- formally dividing the sintered media bed into a plurality of vertical sections extending from a first end of the sealable sintering vessel to a second end of the sealable sintering vessel, each of the plurality of vertical sections extending from the upper surface of the sintered soil bed to the lower surface of the sintered soil bed, and from the first side of the sealable sintering vessel to the second side of the sealable sintering vessel, so that each of the plurality of vertical sections encompasses a plurality of the vertical channels formed in the sintered media bed;
- selecting a first vertical section of the plurality of vertical sections of the sintered soil bed at a first end of the sealable sintering vessel, and passing heated air at a temperature of about 1,100° F. through the formed vertical channels encompassed by the first vertical section; and
- passing the heated air through the formed vertical channels encompassed by each of the remaining vertical sections of the plurality of vertical sections of the sintered soil bed in sequence from the first end of the sealable sintering vessel to the second end of the sealable sintering vessel;
- permitting the sintered soil bed to rest at a soil temperature greater than about 400° F. to mobilize PFAS contaminants in the sintered soil bed;
- cooling the sintered soil bed by passing cooling air at ambient temperature through the formed vertical channels of each of the plurality of vertical sections of the sintered soil bed in sequence from the first end of the sealable sintering vessel to the second end of the sealable sintering vessel and collecting the cooling air at the lower surface of the media bed by drawing the cooling air into one or more lateral extraction lines in a floor of the sealable sintering vessel using a vacuum blower; and
- condensing PFAS contaminants from the collected cooling air.

13. The method of claim 12, wherein each section of the sintered soil bed is heated to a temperature above at least 419° F. by the heated air, and subsequently cooled to a temperature below 365° F. by the cooling air.

14. The method of claim 12, wherein treating the collected cooling air includes using a direct spray of cooling water to condense PFAS contaminants from the collected cooling air.

15. The method of claim 14, further comprising recycling the used cooling water in order to maintain a water temperature above ambient temperatures and below the boiling point of PFAS contaminants.

16. An apparatus for thermal decontamination of a porous substrate, comprising:
- a sealable sintering vessel configured to hold the porous substrate, the sealable sintering vessel including a first side wall and a second side wall, a first end, and a second end, and a floor that includes a plurality of extraction lines extending at right angles to the side walls of the sealable sintering vessel;
- a shaping head that is configured to move from the first end wall to the second end wall of the sintering vessel, where the shaping head includes a vibrating member capable of densifying the porous substrate, and a plurality of extendable rods capable of forming vertical channels in the densified porous substrate, the formed vertical channels extending from an upper surface of the densified porous substrate to the sintering vessel floor;
- an air injection head that is configured to move from the first end to the second end of the sintering vessel, where the air injection head is configured to inject treated gases into the vertical channels formed in the densified porous substrate within each of a series of lateral sections of the sintering vessel, where each lateral section extends from the upper surface of the densified porous substrate to the sintering vessel floor, and from the first side wall to the second side wall of the sintering vessel, and each lateral section corresponds to one or more of the plurality of extraction lines in the sintering vessel floor;
- a sealable flexible cover, coupled to the air injection head, where the cover extends from the first side wall to the second side wall and from the first end to the second end of the sintering vessel, and can accommodate a sequential movement of the air injection head from the first end to the second end of the sintering vessel;
- wherein the apparatus is configured to inject air into a densified porous substrate using the air injection head, and collect the injected air from the corresponding one or more extraction lines using a vacuum blower.

17. The apparatus of claim 16, further comprising a heating apparatus capable of heating the air injected by the air injection head.

18. The apparatus of claim 16, wherein each of the plurality of extendable rods has an elongate cross-section or a hexagonal cross-section.

19. The apparatus of claim 16, further comprising a vapor treatment unit configured to remove contaminants from the air collected from the extraction lines.

20. The apparatus of claim 16, wherein each of the first end and the second end of the sealable sintering vessel can be opened in a way that creates a loading drive path extending a length of the sintering vessel.

21. The apparatus of claim 20, further comprising a loading ramp at each of the first end and the second end of the sealable sintering vessel.

22. The apparatus of claim 16, further comprising a diagnostic sensor capable of detecting one or more of carbon monoxide, acetone, and methylethylketone in the air collected from the extraction lines.

* * * * *